(12) United States Patent
Martinez et al.

(10) Patent No.: US 10,836,120 B2
(45) Date of Patent: Nov. 17, 2020

(54) HYBRID COMPOSITE STRUCTURES WITH INTEGRATED 3-D PRINTED ELEMENTS

(71) Applicant: DIVERGENT TECHNOLOGIES, INC., Los Angeles, CA (US)

(72) Inventors: Antonio Bernerd Martinez, El Segundo, CA (US); Richard Winston Hoyle, Clarkston, MI (US); Ian Hawthorn Ashdown, San Clemente, CA (US)

(73) Assignee: DIVERGENT TECHNOLOGIES, INC ., Los Angeles, CA (US)

( * ) Notice: Subject to any disclaimer, the term of this patent is extended or adjusted under 35 U.S.C. 154(b) by 171 days.

(21) Appl. No.: 16/114,035

(22) Filed: Aug. 27, 2018

(65) Prior Publication Data

US 2020/0061935 A1 Feb. 27, 2020

(51) Int. Cl.
*B29C 70/00* (2006.01)
*B29C 70/30* (2006.01)
*B29C 64/393* (2017.01)
*B29C 64/118* (2017.01)
*B29C 65/48* (2006.01)
(Continued)

(52) U.S. Cl.
CPC ............ *B29C 70/30* (2013.01); *B29C 64/118* (2017.08); *B29C 64/393* (2017.08); *B29C 65/48* (2013.01); *B29L 2031/3014* (2013.01); *B33Y 10/00* (2014.12); *B33Y 50/02* (2014.12); *B33Y 80/00* (2014.12); *Y10T 428/24612* (2015.01)

(58) Field of Classification Search
CPC ......................... B29C 70/30; Y10T 428/24612

USPC ........................................................ 428/211.1
See application file for complete search history.

(56) References Cited

U.S. PATENT DOCUMENTS 5,203,226 A 4/1993 Hongou et al.
5,742,385 A 4/1998 Champa
(Continued)

FOREIGN PATENT DOCUMENTS

EP 0373101 A2 6/1990
WO 1996036455 A1 11/1996
(Continued)

OTHER PUBLICATIONS

US 9,202,136 B2, 12/2015, Schmidt et al. (withdrawn)
(Continued)

*Primary Examiner* — Betelhem Shewareged
(74) *Attorney, Agent, or Firm* — Arent Fox LLP

(57) ABSTRACT

An additively manufactured (AM) hybrid composite structure is disclosed. The AM hybrid composite structure includes a first portion and a second portion. The second portion includes one or more AM elements which are configured to enable integration of the second portion with the first portion to form an integrated component including both the second portion and the first portion. A method of manufacturing a hybrid composite structure is disclosed. The method includes manufacturing a first portion, and additively manufacturing a second portion. The step of additively manufacturing the second portion includes co-printing one or more AM elements. The method further includes using the one or more AM elements as a part of a tool to integrate the first portion with the second portion, and forming an integrated component including both the first portion and the second portion.

36 Claims, 19 Drawing Sheets

(51) Int. Cl.
  *B29L 31/30* (2006.01)
  *B33Y 10/00* (2015.01)
  *B33Y 80/00* (2015.01)
  *B33Y 50/02* (2015.01)

(56) References Cited

U.S. PATENT DOCUMENTS

| | | | |
|---|---|---|---|
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |
| 9,823,143 B2 | 11/2017 | Twelves, Jr. et al. | |

(56) References Cited

U.S. PATENT DOCUMENTS

| | | |
|---|---|---|
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |

(56) References Cited

U.S. PATENT DOCUMENTS

| | | |
|---|---|---|
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108058 A1 | 5/2006 | Chapman et al. |
| 2006/0108783 A1 | 5/2006 | Ni et al. |
| 2012/0231225 A1* | 9/2012 | Mikulak .............. B32B 3/26 428/172 |
| 2013/0266816 A1 | 10/2013 | Xu |
| 2014/0277669 A1 | 9/2014 | Nardi et al. |
| 2015/0041098 A1 | 2/2015 | McGuire et al. |
| 2015/0247580 A1 | 9/2015 | Au et al. |
| 2017/0113344 A1 | 4/2017 | Schönberg |
| 2017/0136697 A1 | 5/2017 | Kia et al. |
| 2017/0341309 A1 | 11/2017 | Piepenbrock et al. |
| 2018/0229401 A1 | 8/2018 | Gunner et al. |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2017040728 A1 | 3/2017 |
| WO | 2017146284 A1 | 8/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Apr. 12, 2019, regarding PCT/US2018/054996.
International Search Report and Written Opinion received in PCT/US2019/047286 dated Nov. 7, 2019.

* cited by examiner

HYBRID COMPOSITE STRUCTURES WITH INTEGRATED 3-D PRINTED ELEMENTS

BACKGROUND

Field

The present disclosure relates generally to manufacturing techniques, and more specifically to composite structures for use in vehicles, boats, aircraft and other engineered structures.

Background

Numerous types of composite structures are manufactured and used in transport structures such as vehicles, trucks, trains, motorcycles, boats, aircraft, and the like. Such composite structures can serve any one or more of functional, structural, or aesthetic purposes within, or as part of, a transport structure.

Conventionally, manufacturing of composite structures with internal cores requires part-specific lamination tooling to define and hold the shapes of the composite structures until the composite structures are cured.

For example, traditional ply placement and/or orientation are achieved using laser projection or ply books, both of which add expense and time to the process.

For another example, composite structure fabrication requires the application of vacuum bagging over the laminate to consolidate the composite material and remove trapped gas. Traditional methods require external vacuum generation devices to be attached to the external side of the vacuum bag. However, vacuum devices external to the bag may add expense and have the problems of possible leakage.

For yet another example, one method for manufacturing composite structures is to infuse resin into dry fibers. In traditional methods, resin is infused into the dry fibers by using external resin feed lines that also feed into a vacuum bag. However, external resin feed lines may also add expense and have the problems of possible leakage. Furthermore, by relying solely on external vacuum and resin infusion points, the risk of incomplete infusion or curing is a possibility.

There is a need to composite structures and related manufacturing methods that facilitate the tooling function and eliminate some external tools to reduce the cost and save time of the manufacturing process.

SUMMARY

Additively manufactured (AM) hybrid composite structures will be described more fully hereinafter with reference to three-dimensional printing techniques.

In one aspect, an additively manufactured (AM) hybrid composite structure is disclosed. The AM hybrid composite structure includes a first portion and a second portion. The first portion includes a first material. The second portion includes a second material. The second portion is configured to integrate with the first portion. The second portion further includes one or more AM elements that are configured to enable integration of the second portion with the first portion to form an integrated component including both the second portion and the first portion.

In another aspect, a method of manufacturing a hybrid composite structure is disclosed. The method includes manufacturing a first portion, and additively manufacturing a second portion. The step of additively manufacturing the second portion includes co-printing one or more additively manufactured (AM) elements. The method further includes using the one or more AM elements as a part of a tool to integrate the first portion with the second portion, and forming an integrated component including both the first portion and the second portion.

It will be understood that other aspects of apparatuses and methods of producing parts for transport structures will become readily apparent to those skilled in the art from the following detailed description, wherein it is shown and described only several embodiments by way of illustration. As will be realized by those skilled in the art, the parts and methods of producing the parts are capable of other and different embodiments and its several details are capable of modification in various other respects, all without departing from the disclosure. Accordingly, the drawings and detailed description are to be regarded as illustrative in nature and not as restrictive.

BRIEF DESCRIPTION OF THE DRAWINGS

Additively manufactured (AM) hybrid composite structures will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of additively manufactured (AM) hybrid composite structures and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

In some aspects, an AM hybrid composite structure is disclosed. The AM hybrid composite structure includes a first portion and a second portion. The first portion includes a first material. The second portion includes a second material. The second portion is configured to integrate with the first portion. The second portion further includes one or more AM elements that are configured to enable integration of the second portion with the first portion to form an integrated component including both the second portion and the first portion.

In some aspects, a method of manufacturing a hybrid composite structure is disclosed. The method includes manufacturing a first portion, and additively manufacturing a second portion. The step of additively manufacturing the second portion includes co-printing one or more additively manufactured (AM) elements. The method further includes using the one or more AM elements as a part of a tool to integrate the first portion with the second portion, and forming an integrated component including both the first portion and the second portion.

3-D printing of internal core structures enables the tooling function to be facilitated by the 3-D printed core structures, thereby eliminating the need for some external tools. Additional functions that can be included in the 3-D printed core structures are described below.

The use of additive manufacturing, also known as 3-D printing, in the context of composite tooling provides significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that are not possible to manufacture via traditional manufacturing processes.

Figure 1:
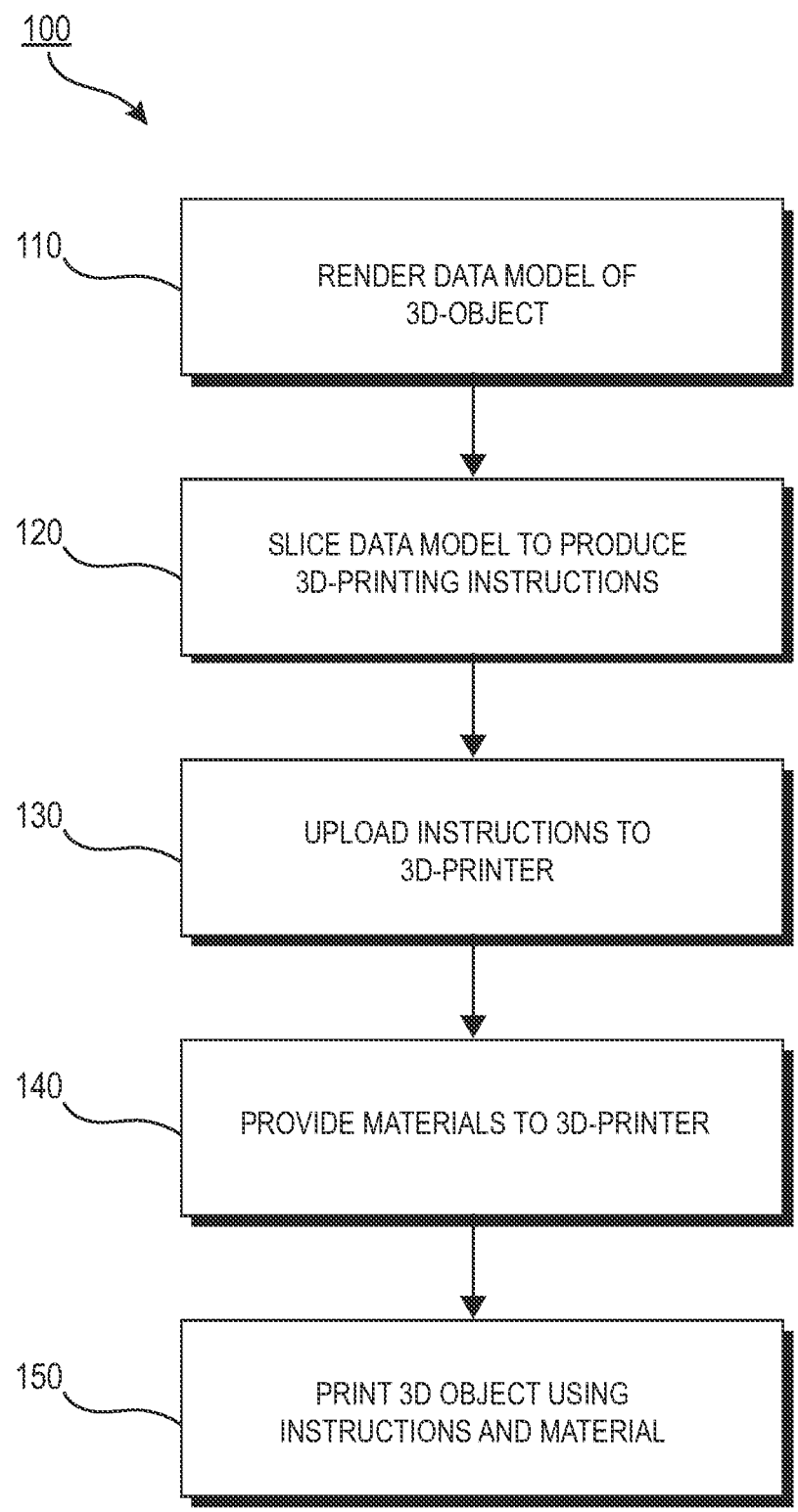
FIG. 1 is a flow diagram illustrating an exemplary process of initiating a process of 3-D printing.

FIG. 1 is a flow diagram 100 illustrating an exemplary process of initiating a process of 3-D printing. A data model of the desired 3-D object to be printed is rendered (step 110). A data model is a virtual design of the 3-D object. Thus, the data model may reflect the geometrical and structural features of the 3-D object, as well as its material composition. The data model may be created using a variety of methods, including 3D scanning, 3D modeling software, photogrammetry software, and camera imaging.

3D scanning methods for creating the data model may also use a variety of techniques for generating a 3-D model. These techniques may include, for example, time-of flight, volumetric scanning, structured light, modulated light, laser scanning, triangulation, and the like.

3-D modeling software, in turn, may include one of numerous commercially available 3-D modeling software applications. Data models may be rendered using a suitable computer-aided design (CAD) package, for example in an STL format. STL files are one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 120). Numerous slicer programs are commercially available. Slicer programs convert the data model into a series of individual layers representing thin slices (e.g., 100 microns thick) of the object be printed, along with a file containing the printer-specific instructions for 3-D printing these successive individual layers to produce an actual 3-D printed representation of the data model.

A common type of file used for this purpose is a G-code file, which is a numerical control programming language that includes instructions for 3-D printing the object. The G-code file, or other file constituting the instructions, is uploaded to the 3-D printer (step 130). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 140). In fused deposition modelling (FDM) 3-D printers, for example, materials are often loaded as filaments on spools, which are placed on one or more spool holders. The filaments are typically fed into an extruder apparatus which, in operation, heats the filament into a melted form before ejecting the material onto a build plate or other substrate, as further explained below. In selective laser sintering (SLS) printing and other methods, the materials may be loaded as powders into chambers that feed the powder to a build platform. Depending on the 3-D printer, other techniques for loading printing materials may be used.

The respective data slices of the 3-D object are then printed based on the provided instructions using the material(s) (step 150). In 3-D printers that use laser sintering, a laser scans a powder bed and melts or sinters the powder together where structure is desired, and avoids scanning areas where the sliced data indicates that nothing is to be printed. This process may be repeated thousands of times until the desired structure is formed, after which the printed part is removed from a fabricator. In fused deposition modelling, parts are printed by applying successive layers of model and support materials to a substrate. In general, any suitable 3-D printing technology may be employed for purposes of this disclosure.

Figure 2:
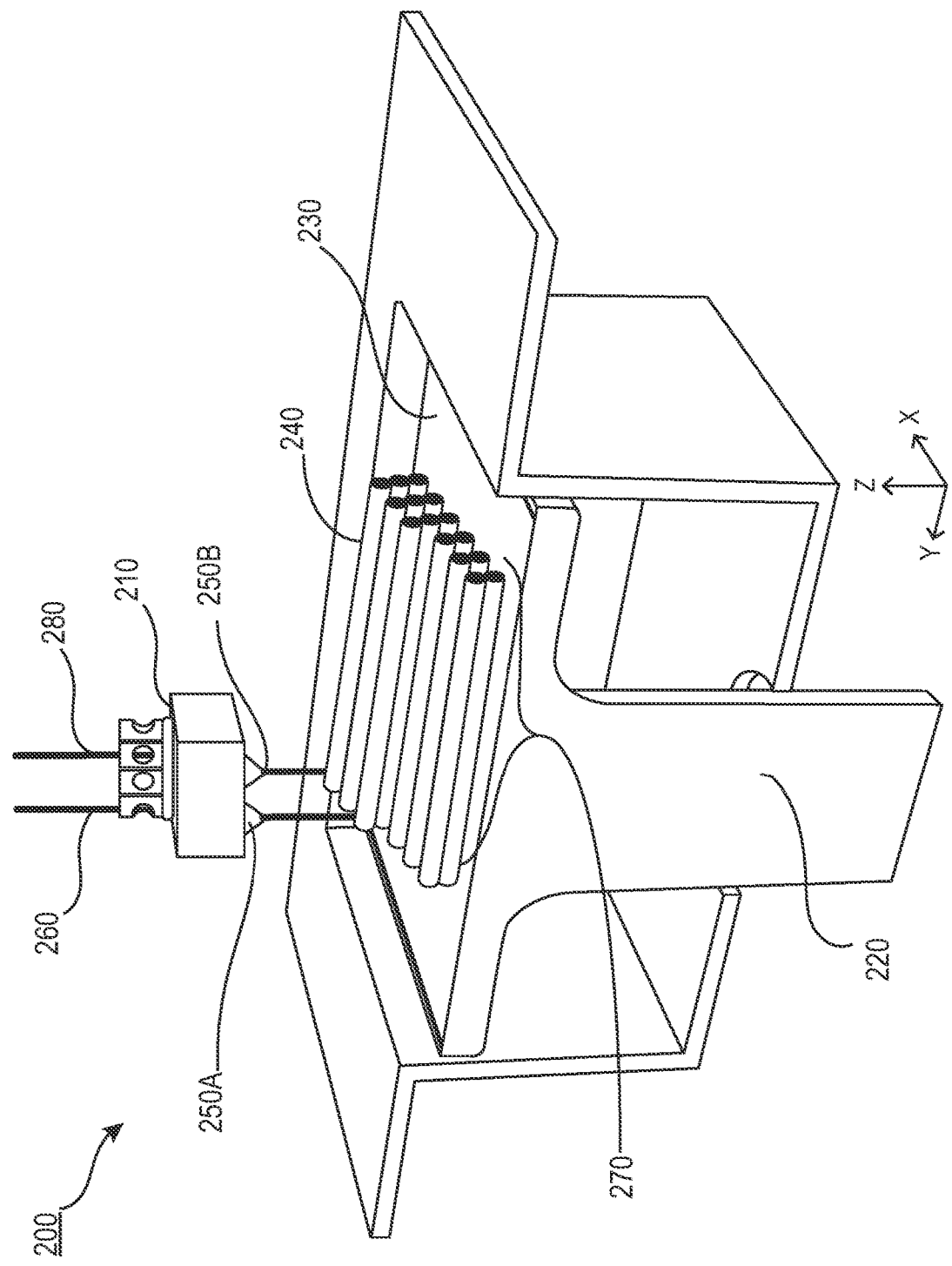
FIG. 2 is a block diagram of an exemplary 3-D printer.

FIG. 2 is a block diagram of an exemplary 3-D printer 200. While any number of 3-D printed technologies can be suitably employed, the 3-D printer 200 of FIG. 2 is discussed in the context of an FDM technique. 3-D printer 200 includes an FDM head 210 that in turn includes extrusion nozzles 250A and 250B, a moveable build stage 220, and a build plate 230 at the top of the build stage 220.

Depending on the intended composition of the structure and the need for any support material for providing support to overhanging elements of the structure that might otherwise be subject to possible gravitational deformation or collapse, a plurality of materials may be used for printing an object. One or more suitable filament materials 260 may be wound on a spool (not shown) and fed into FDM head 210. (In other technologies described above, the material may be provided as a powder or in other forms). The FDM head 210 can be moved in X-Y directions based on the received printing instructions by a numerically controlled mechanism such as a stepper motor or servomotor. The material, which may in one exemplary embodiment constitute a thermoplastic polymer, may be fed to the FDM head 210 which includes the extrusion nozzles 250A and 250B. The extruder in FDM head 210 heats the filament material 260 into a molten form, and extrusion nozzle 250A ejects the molten material and deposits it onto the build plate 230 of build stage 220.

Responsive to the received printing instructions, the FDM head 210 moves about a horizontal (X-Y) plane such that extrusion nozzle 250A drops the filament material 260 at the target location to form a line 240 of applied material. (The FDM head 210 may also be configured to move in the Z-direction and/or to rotate about one or more axes in certain configurations). The layer 270 of filament material 260, including line 240, is formed by depositing the filament material 260 line by line, with each line of the filament material 260 hardening as the material is deposited on the build plate 230. After one layer 270 is formed at the appropriate locations in the X-Y plane, the next layer may be formed in a similar way.

The build plate 230 may be a component of a controlled table moveable in at least the vertical Z direction. When rendering of a layer 270 is completed, the build stage 220 and build plate 230 may be lowered by an amount proportional to the thickness of layer 270 in the vertical (Z) direction. The build stage 220 and build plate 230 may be lowered so that the printer can begin application of the next layer. Rendering and completing a layer and lowering the build stage 220 and build plate 230 may be repeated until a plurality of cross sectional layers (e.g., from lines 240) having a desired shape and composition are created.

While a substantially rectangular structure of layers is shown for purposes of simplicity in this illustration, it will be appreciated that the actual printed structure may embody substantially any shape and configuration depending on the data model. That is, the actual shape of the rendered layers will correspond to the defined geometry of the 3-D-model being printed.

In addition, as indicated above, a plurality of different materials may be used to print the object. In some instances, two different filament materials 260 and 280 may concurrently be applied by respective extruder nozzles 250A and 250B.

In an exemplary embodiment, a part for a transport structure is formed using an appropriately shaped and structured tooling shell to mold one or more layers of composite material. The composite material is adhered to the surface of the tooling shell to form an integrated structure that includes both the composite material and the tooling shell. The integrated structure is operable for use as a component in a transport structure such as a vehicle. In an exemplary embodiment, the tooling shell is 3-D printed, thereby eliminating the often costly and time-consuming techniques associated with the laborious machining process. In these embodiments, the tooling shell may play the dual role of molding the composite material and serving as a useful structure in conjunction with the molded material to form a component for assembly within the transport structure itself, such as a vehicle panel, joint or other component, an aircraft wing, and the like.

Figure 3:
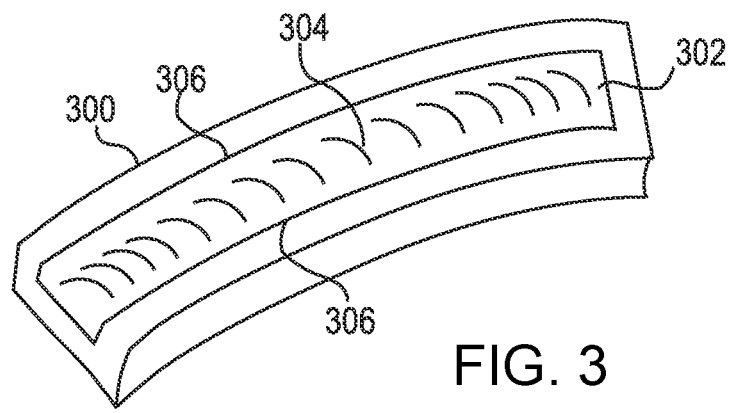
FIG. 3 shows a perspective view of a 3-D printed tooling shell

FIG. 3 shows a perspective view of a 3-D printed tooling shell 300. The tooling shell may include any material having appropriate or suitable characteristics for molding another material. For example, if the material to be molded using the tooling shell is carbon fiber reinforced polymer (CFRP), then an Invar alloy may be a suitable candidate for use in molding the material because its coefficient of thermal expansion is very similar to that of carbon fiber. In other cases, the tooling structure may be composed of other materials, including metals, alloys, and plastics. The indentation 302 in the 3-D printed tooling shell 300 may be of a suitable volume for accommodating an appropriate amount of material to be molded. In another exemplary embodiment, an upper half of a tooling shell may be provided in order to seal the material during curing. In still other embodiments, vacuum and fluid channels may be integrated into the 3-D printed tooling shell 300 in order to enable resin material to be provided to indentation 302 to facilitate the process of fabricating the material. In other embodiments, because the 3-D printed tooling shell 300 may ultimately serve as a structural part in addition to a mold, the choice of materials out of which the 3-D printed tooling shell 300 can be made may also be limited by the types of materials that are appropriate for the final component as assembled into the transport structure.

In one embodiment, the adhesive to be used for CRFP and the metal 3-D printed mold can be the matrix material of the CFRP itself.

Further included in FIG. 3 are small surface indentations 304 that had been 3-D printed into the material. Because the 3-D printed tooling shell 300 and the material to be molded can ultimately form a single component for assembly into a transport structure, it may be desirable in some embodiments to provide a mechanism to cause the component to adhere to the interior 302 of the 3-D printed tooling shell 300. The purpose of the small surface indentations 304 are to assist in providing surface adhesion between the inner portion of the 3-D printed tooling shell 300 and the material to be molded in the 3-D printed tooling shell 300. In other embodiments, surface indentations may also be formed on the inner sidewalls 306 of the tooling shell to further facilitate the surface adhesion process. In alternative embodiments, other means may be used to assist in surface adhesion. For example, a resin may be applied to inner surface 302 and/or the inner sidewalls 306 prior to insertion of the materials to be molded. Alternatively, clamps, screws, nuts and bolts, nails, thermal fusion, etc. may be used to secure the composite material to the tooling shell.

Figure 4:
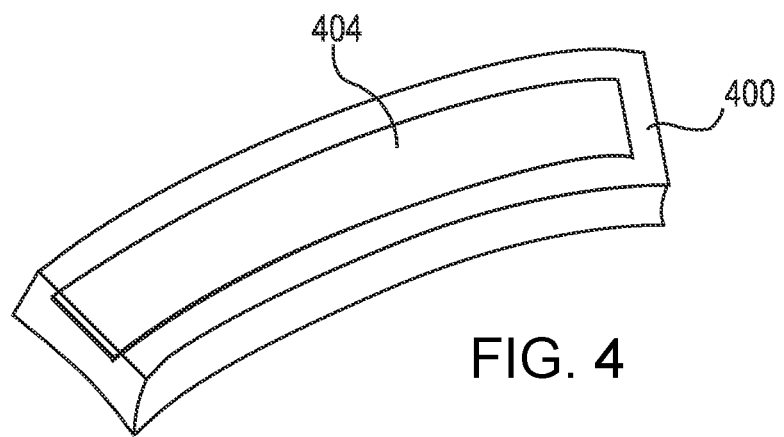
FIG. 4 shows a perspective view of 3-D printed tooling shell with CFRP inserted therein.

FIG. 4 shows a perspective view of 3-D printed tooling shell 400 with CFRP inserted therein. As noted above, a geometry 404 of a structure to be molded within the 3-D printed tooling shell 400 may be designed to conform to the shape of an inner surface of the 3-D printed tooling shell 400, depending on how the mold is configured. In this manner, the tooling shell acts as a section of a mold to shape the composite material that will be cured into the a portion of the component, as described further below.

A composite fabrication process including a composite layup may be performed using the 3-D printed tooling shell 400. In this example, carbon fiber material (or another suitable material) may be applied via a layup process on inner surface of the 3-D printed tooling shell 400 as a first step in producing the component. The carbon fiber material may be laid over the 3-D printed tooling shell 400, compressed and cured.

Figure 5:
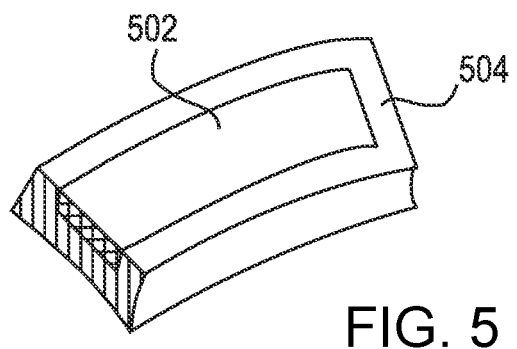
FIG. 5 is a cross sectional perspective view of the combined material and tooling shell.

FIG. 5 is a cross sectional perspective view 500 of the combined material 502 and tooling shell 504. The difference in shading between material 502 and tooling shell 504 shows that the two structures in this particular embodiment have a different material composition, although such a feature need not be necessary in certain embodiments.

Figure 6:
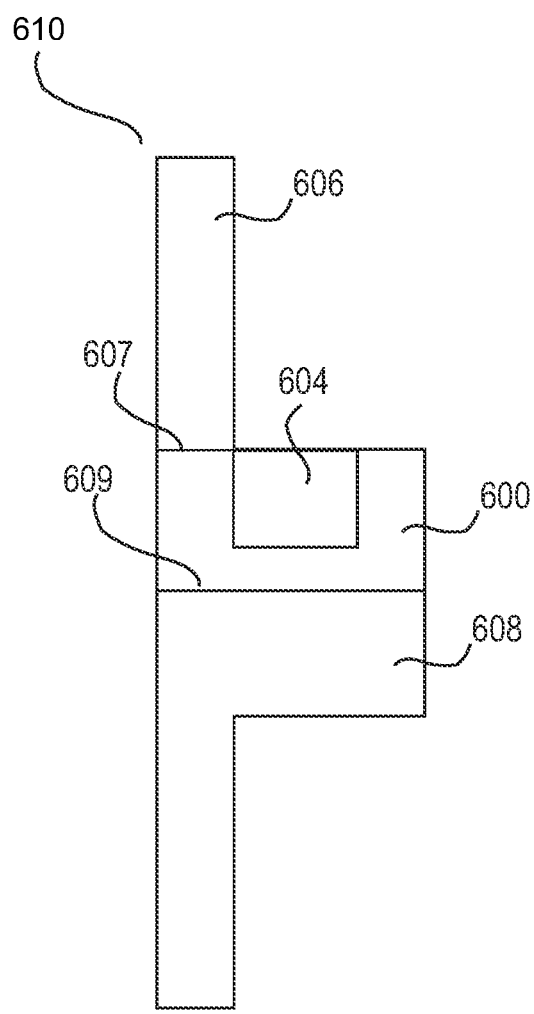
FIG. 6 shows a side view of an exemplary interior door panel 610 in a transport structure using the dual assembled component.

FIG. 6 shows a side view of an exemplary interior door panel 610 in a transport structure using the dual assembled component 600. In this embodiment, the door panel includes a first component 606 and a second component 608, either of which may be molded or 3-D printed. In this exemplary embodiment, first component 606 is adhered via any available means to a surface 607 of the dual assembled component 600 described in FIGS. 3-5. Second component 608 is adhered via any available means to a surface 609 of the component of FIG. 4 (i.e., the unseen bottom portion of the component in FIG. 4). The interior door panel 610 can thereupon be used in a transport structure with the carbon fiber material 604 appropriately placed. It should be understood that the integration of the component with an interior door panel is purely for illustrative purposes, and the component of FIG. 4 can be used in a wide number of practical applications in various portions of a transport structure.

In one exemplary embodiment, a layup uses pre-impregnated ("prepreg") carbon fiber plies that are delivered onto the 3-D printed tooling shell 400 (FIG. 4) with the resin matrix applied. The prepreg technique provides effective resin penetration and assists in ensuring substantially uniform dispersion of the resin. The prepreg plies may be applied onto the 3-D printed tooling shell 400 to form a laminate stack.

In another embodiment, a dry lay-up uses dry woven fiber sheets. Resin may thereupon be applied to the dry plies after layup is complete, such as by resin infusion. In an alternative exemplary embodiment, wet layup may be used wherein each ply may be coated with resin and compacted after being placed.

As indicated above, a top shell or a seal for the mold may be 3-D printed and applied over 3-D printed tooling shell 400 to provide a means to mold the structure of the material 502 (FIG. 5), for example, into the geometry 404 of the inner part of the 3-D printed tooling shell 400 (FIG. 4). Upon completion of the molding process, the carbon fiber material may, for example, be vacuum compacted and baked in an oven for a designated time period.

The specific molding and resin infusion processes used during these stages may vary depending on variables such as molding techniques, design constraints, and desired manufacturing yield. Generally, the 3-D-printed tooling shell may be used in connection with a variety of composite manufacturing techniques including, for example, Resin Transfer Molding (RTM), hand layup, prepregs, sheet molding, and Vacuum Assisted Resin Transfer Molding (VARTM).

Figure 7:
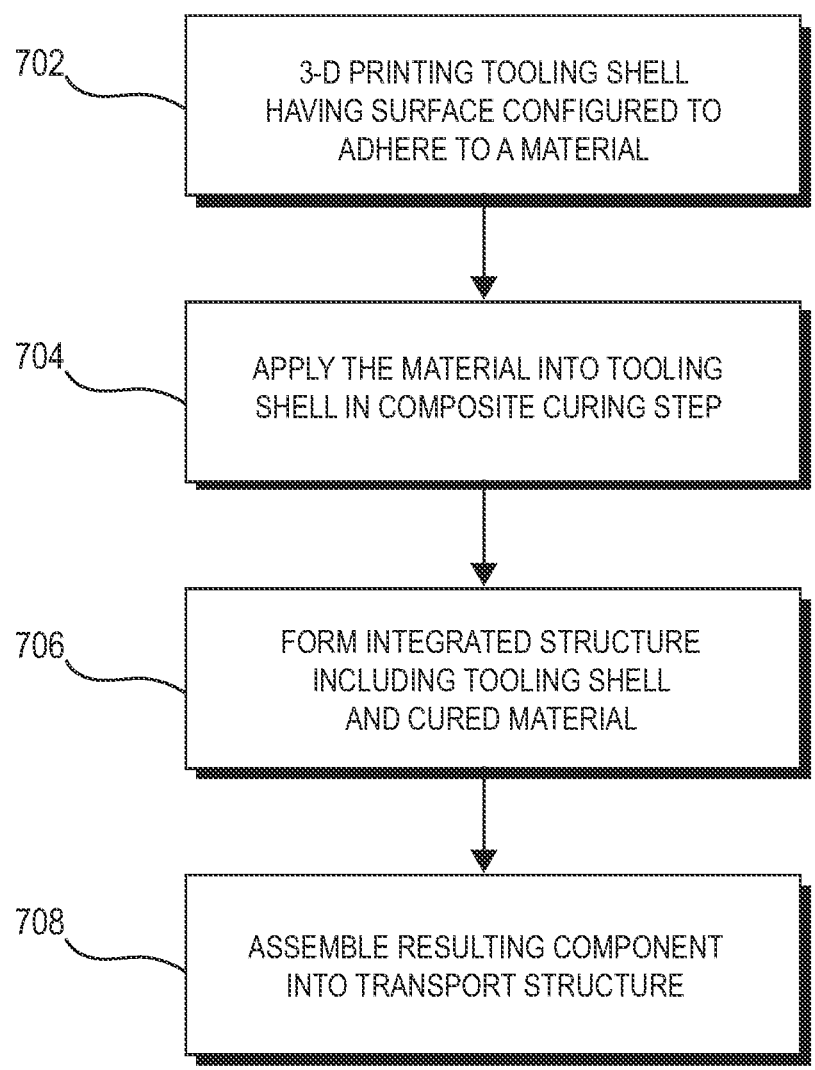
FIG. 7 is a flow diagram illustrating an exemplary process for producing a component having a composite reinforcement overlaying a tooling shell to form an integrated structure for use as a component in a transport structure.

FIG. 7 shows an exemplary flow diagram of a method for creating a component for use in a transport structure. At 702, a tooling shell is 3-D printed using a geometry that can ultimately enable it to be used as part of an integrated structure for further within another structure such as a vehicle panel. The tooling shell may be designed for potential adherence to a material to be subsequently used. At 704, the material, such as CFRP or another composite fabric, is applied and a composite fabrication process is used to mold and harden the material. At 706, when the composite fabrication is complete, the material adheres to the tooling shell and a resulting component is formed which includes an integrated structure composed of the cured material and the tooling shell. At 708, the integrated structure is assembled as a component into a transport structure.

Figure 8:
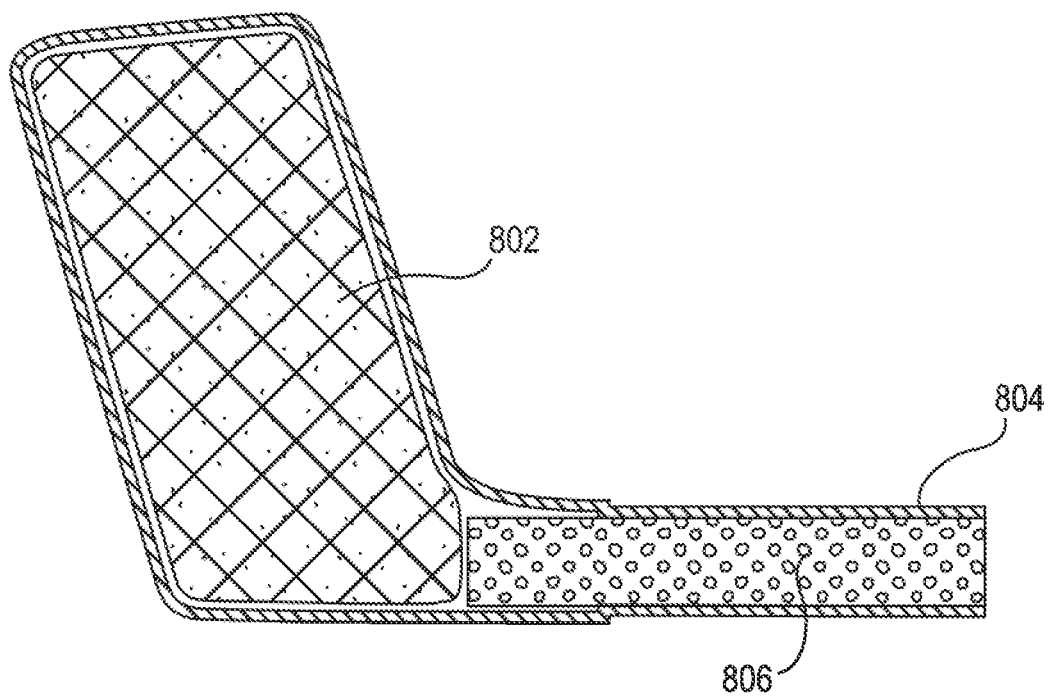
FIG. 8 is an illustration of an integrated structure composed of an overlay of fabric composite reinforcement over additively manufactured tooling.

In another exemplary embodiment, a 3-D printed plastic frame is first used as a template for composite tooling. On completion of the cure of the composite material, the resulting assembly may then be used as a frame or other component for a transport structure. FIG. 8 is an illustration of a structure composed of an overlay of fabric composite reinforcement over additively manufactured tooling. The 3-D printing technology selection may be driven by the materials requirement and by the speed of the printing process. A 3-D printed plastic frame 802 is formed. Advantageously, plastic printing processes are typically 25-50 times faster than metal printing processes. A further benefit in using additively manufactured plastic tooling is the ability to obtain larger parts because the build chambers of plastic 3-D printers are typically much larger than those of metal 3-D printers. Additionally, the plastic 3-D printers can, in many cases, print much smoother surfaces. In an embodiment, the material used is Acrylonitrile Butadiene Styrene (ABS), a common thermoplastic polymer. However, any number of suitable materials may be used depending on the application and the properties of the materials needed.

Further, in the embodiment shown, a CNC foam core 806 is additively manufactured and coupled to the 3-D printed plastic frame 802 using an adhesive or other available means. In one embodiment, the 3-D printed plastic frame 802 and cnc foam core 806 are co-printed in a single rendering. The foam core may be composed of the same material as the 3-D printed plastic frame 802. In another embodiment, a honeycomb panel configuration is used in place of foam core. It will be appreciated that the illustrated embodiment in FIG. 8 is exemplary in nature as a number of materials and shapes may alternatively be used for purposes of this disclosure.

A variety of fiber composite fabrics may be used in the subsequent composite fabrication process, depending on strength requirements and other factors. Some examples of possible materials include glass fiber, carbon fiber, Kevlar, and the like. In the embodiment shown, glass fiber prepreg layer 804 are draped over the additively manufactured tooling. The glass fiber prepreg layer 804 may include, in one exemplary embodiment, a fiber reinforced polymer (FRP) skin (E Glass). Other composites, including carbon fiber, may be used as well. Layup is performed on the FRP. After the material is cured, the integrated structure composed of the ABS tooling with the 3-D printed plastic frame 802 and cnc foam core 806 and the overlaid glass fiber composite (e.g., glass fiber prepreg layer 804) may then be used as a component in a transport structure.

Figure 9:
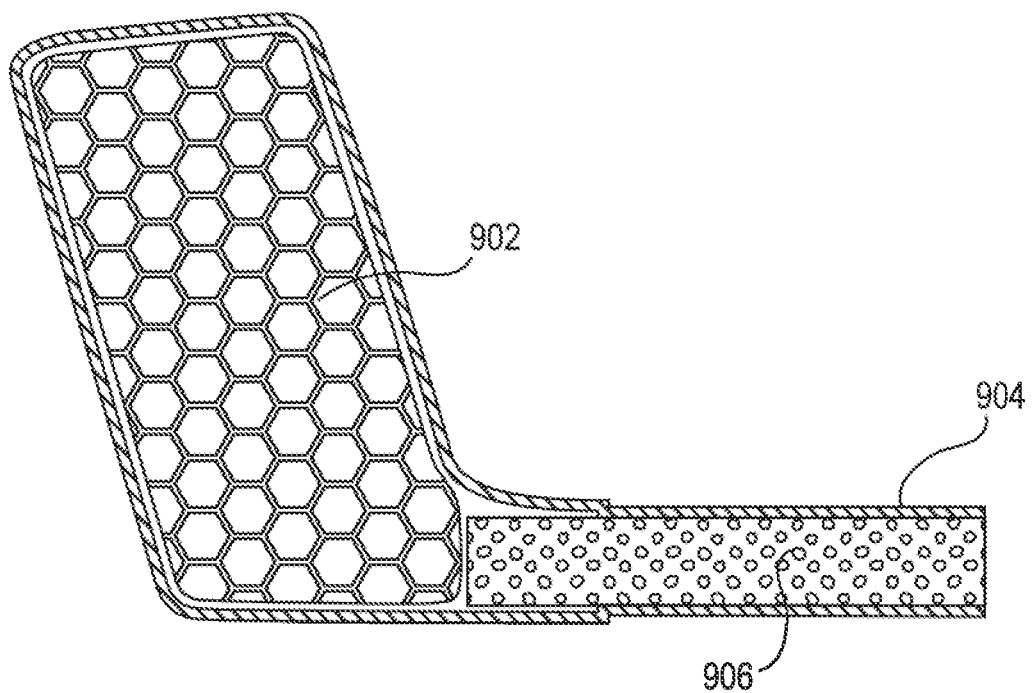
FIG. 9 is an illustration of an integrated structure including tooling formed with an internal lattice structure.

For added weight savings and/or for improved load bearing capabilities, depending on the application and intended use of the integrated structure, the 3-D printed tooling may include a structure that uses an optimized topology. FIG. 9 shows an illustration of an integrated structure including tooling formed with an internal lattice structure. Plastic tooling 902 includes a lattice structure designed for the loads to which it will be subject when it is assembled as a component. The foam core or honeycomb panel structure 906 is included, with the layers of glass fiber reinforced polymer 904 overlaid on the tooling structure. One advantage of this structure includes the savings in plastic material achieved via use of the lattice.

Figure 10:
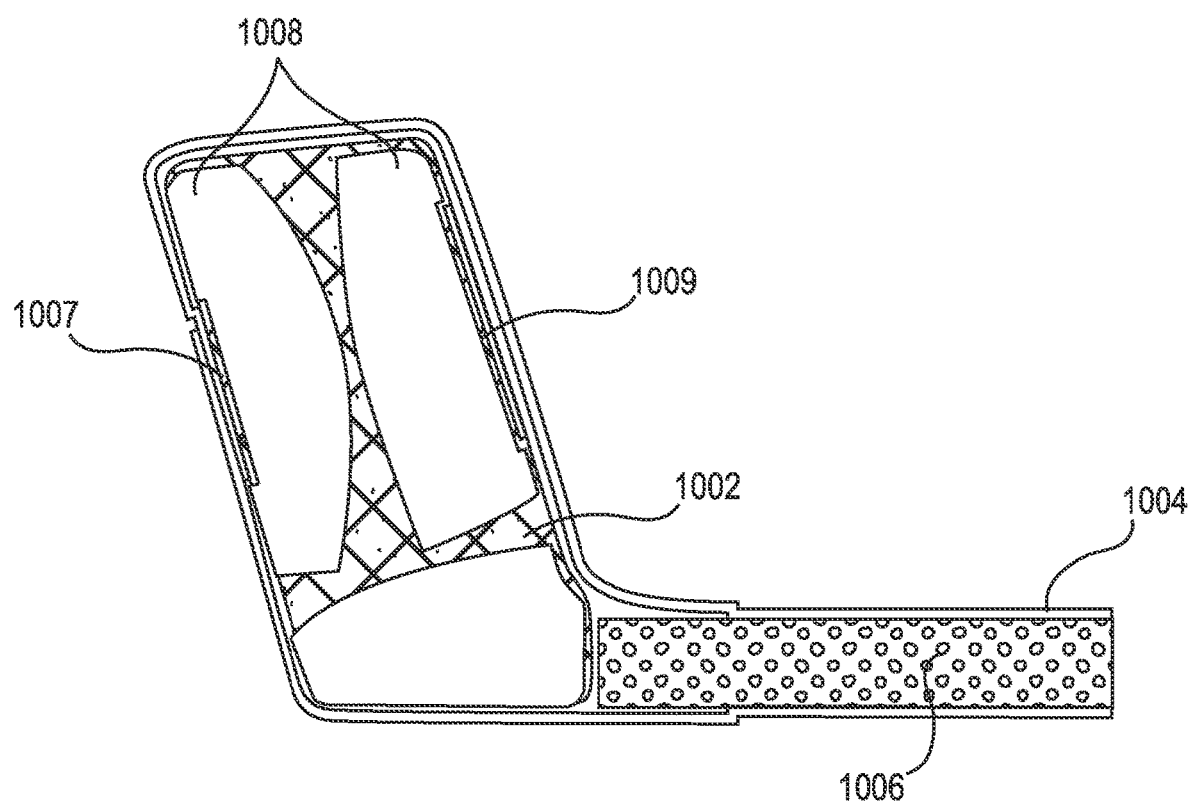
FIG. 10 is an illustration of the integrated structure having pockets and tooling with topology optimization.

In another exemplary embodiment, the tooling may be additively manufactured with pockets for a flush finish. FIG. 10 is an illustration with the integrated structure having pockets and tooling with topology optimization. As seen in FIG. 10, tooling component 1002 is 3-D printed with pockets 1007, 1009 and hollow sections 1008. The pocket 1007 enables the end areas of the glass fiber material surrounding the tooling to have a flush finish. The structure further includes a component 1006 with a honeycomb or foam filling. In addition, to provide reinforcement of one of the pockets 1007, 1009 where mechanical reinforcement is desirable or necessary, CFRP or another composite material may be used to provide local reinforcement for the pockets. As before, prepreg layers of GFRP (or another suitable composite) may be overlaid and cured over the tooling to produce the integrated structure.

Figure 11:
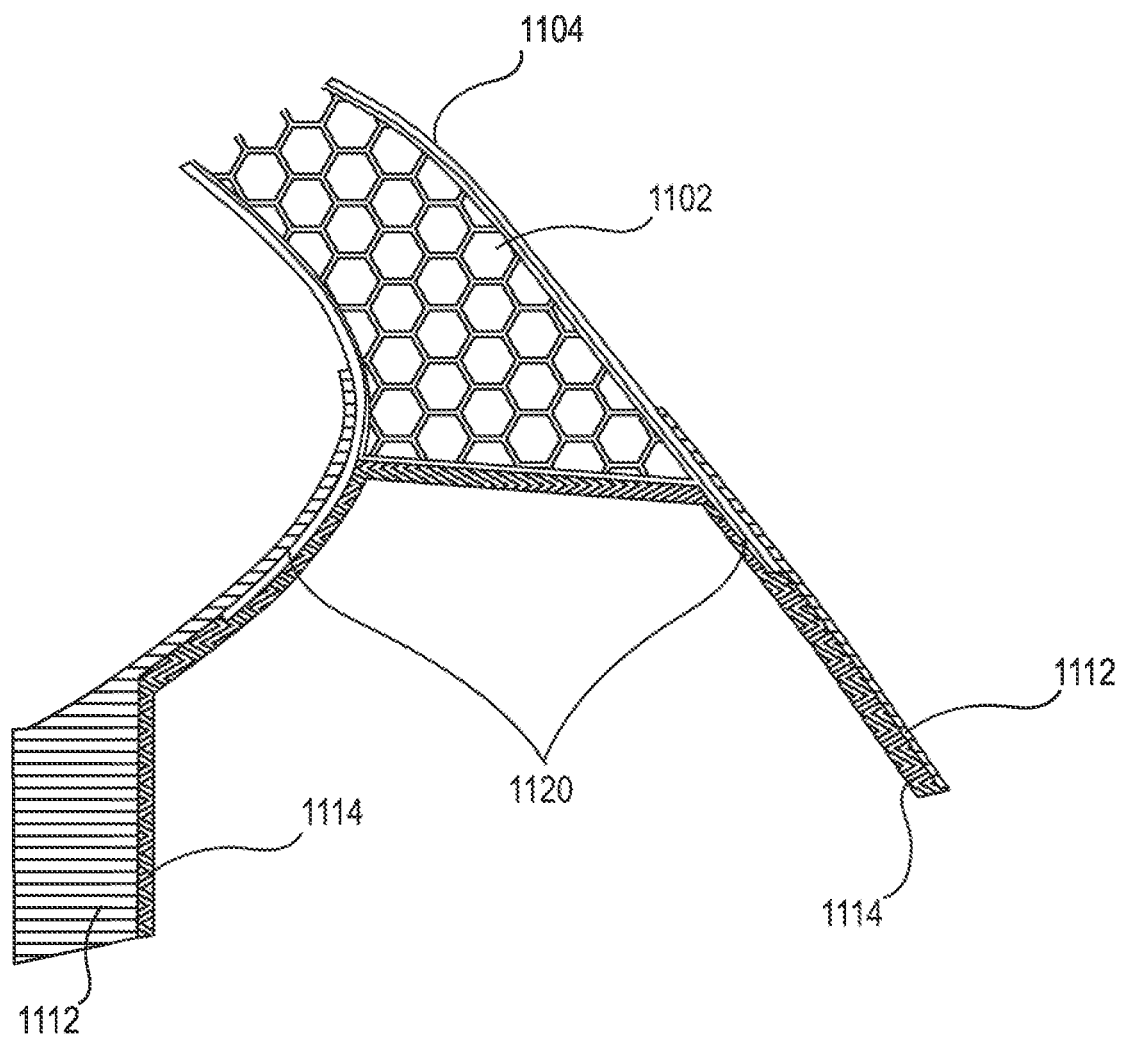
FIG. 11 is an illustration of an integrated structure using co-molded nodes.

In some embodiments, mechanical clamping may be desirable to secure the composite materials in place. FIG. 11 is an illustration of an integrated structure using co-molded nodes. As in previous embodiments, tooling shell 1102 is additively manufactured using ABS or another suitable material. FRP or another suitable, e.g., composite material 1104, is inlaid and cured over the tooling shell. A 3-D printed inner node 1114 is co-printed with the tooling or printed separately and added to secure a first side of portions 1120 of the composite material 1104. Likewise, a 3-D printed outer node 1112 is inserted over a second side of portions 1120 of the composite material. The composite material is therefore clamped and secured to the tooling shell, and the entire integrated structure may be used as a component in a transport structure. In one exemplary embodiment, the nodes are co-printed using aluminum to ensure strength. Other materials, however, may be equally suitable.

Figure 13:
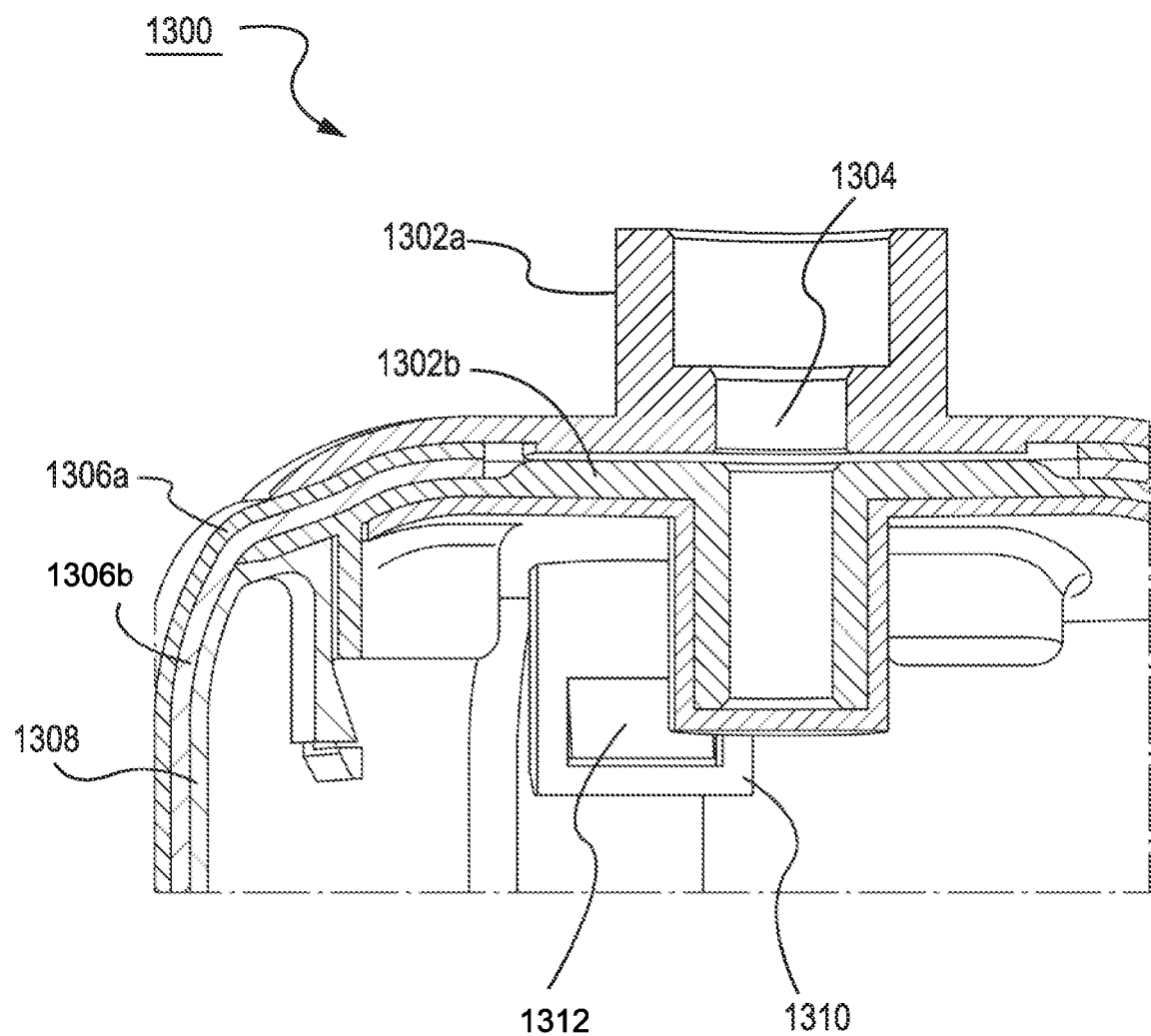
FIG. 13 is an illustration of an integrated structure including composite material sandwiched between nodes and fastened via a mechanical clamp.

In an exemplary embodiment, AM metal nodes can be implemented as suspension pick-up points or interfaces for the crush rails associated with the overall transport structure. Crush rails are energy absorbing rail structures that may be implemented on a vehicle to enable the vehicle to absorb energy from an impact in a controlled and directed manner. The rails may be sandwiched between the metal nodes, which in turn may be attached to the vehicle suspension. An example of such an arrangement is shown in FIG. 13. In another embodiment, mechanical clamping can be used in connection with vacuum connectors to cure a composite layup.

FIG. 13 is an illustration of an integrated structure 1300 including composite material sandwiched between nodes and fastened via a mechanical clamp. The integrated structure 1300 includes upper and lower aluminum nodes 1302a-b, which may be additively manufactured. Beneath node 1302b is tooling shell 1308, which may be additively manufactured using FDM or another suitable technology. In an embodiment, tooling shell 1308 is composed of ABS or a thermoplastic such as ULTEM (polyetherimide).

Laid over tooling shell 1308 are two composite skin layers 1306a and 1306b that may be composed of GFRP. Near their end, GFRP layers 1306a and 1306b contact with nodes 1302a-b. GFRP layers 1306a and 1306b may be cured on top of both of the Al node 1302b and the FDM tooling shell 1308. GFRP layers 1306a-b may then be clamped by nodes 1302a, which may be placed on top of GFRP layers 1306a and 1306b.

To secure the clamping of layers 1306a and 1306b, a feature 1304 for mechanical fastening may be employed. The feature 1304 in this embodiment is a large opening in which a bolt or other fastener can be inserted. The fastener can provide a force to secure the layers 1306a and 1306b, such as by using a standard threaded bolt, a nut-bolt combination or any other suitable mechanical fastening or clamping mechanism. In other embodiments, the clamping feature may be different from the aperture 1304 and may include other types of fasteners or openings to accommodate fasteners.

Also shown in FIG. 13 is a protrusion 1310 from the node 1302b. The protrusion includes an aperture that is configured to "snap fit" into another protrusion 1312, which may be a protrusion from the FDM tooling shell 1308. In an embodiment, the protrusion 1312 is a gradual protrusion jutting out of a longer FDM member (hidden from view by node 1320b) arranged in the vertical direction, with the larger protrusion 1312 at the end. The Al node 1302b may contact and press against the longer FDM member. As the Al node 1302b is moved downward relative to the longer FDM member, the pressure or force causes the larger FDM protrusion 1312 to snap into place. In an embodiment, protrusion 1312 may be affixed to a vehicle suspension system, thereby fastening the integrated structure 1300 to the suspension system. These techniques enable the aluminum clamping mechanism to interface with the FDM tool.

Figure 12:
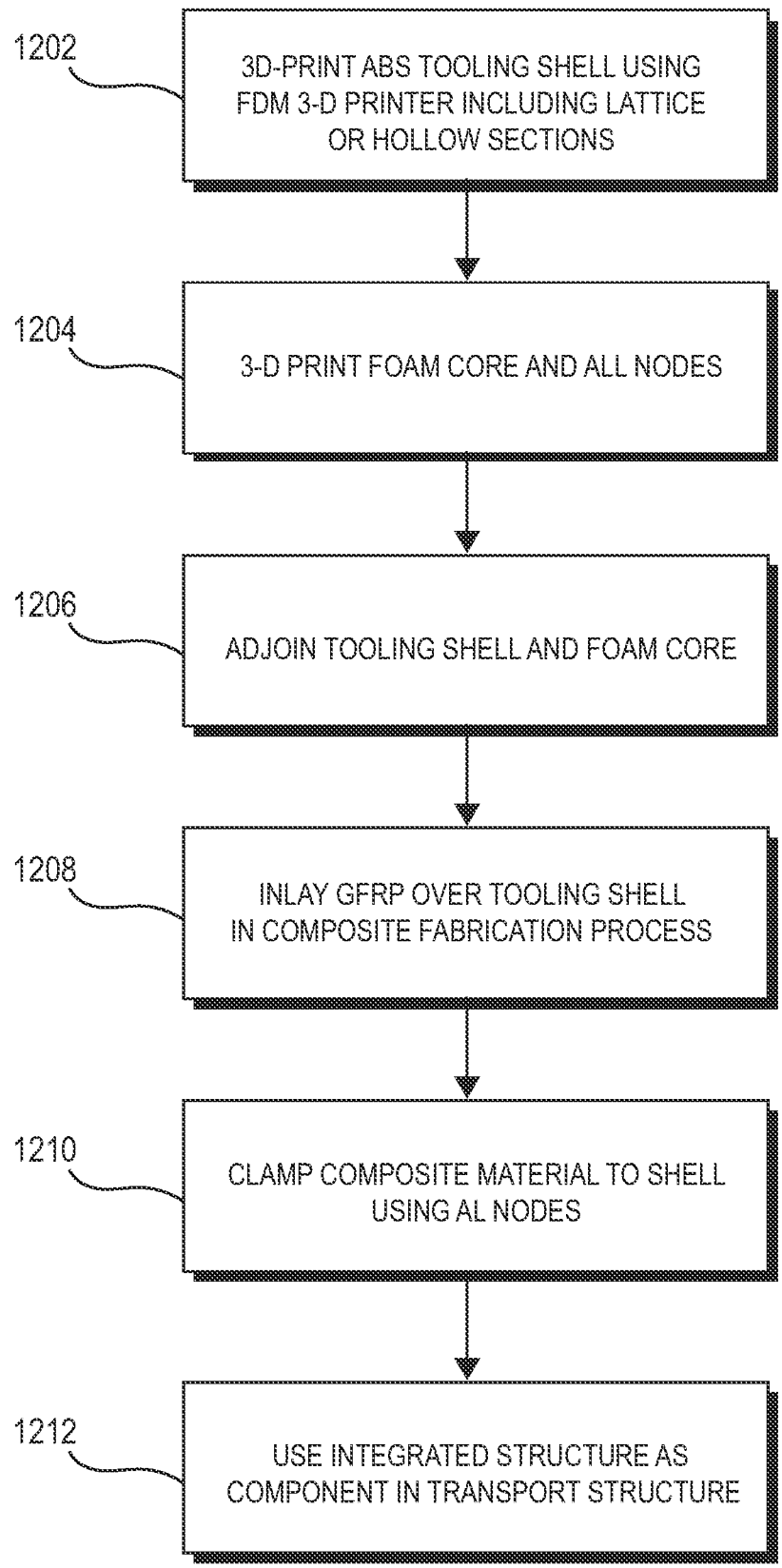
FIG. 12 is a flow diagram illustrating an exemplary process for producing a component having a composite material over a tooling shell to produce an integrated structure for use as a component in a transport structure.

FIG. 12 is a flow diagram illustrating an exemplary process for producing a component having a composite material over a tooling shell to produce an integrated structure for use as a component in a transport structure. At 1202, a plastic tooling shell such as an ABS shell is additively manufactured using a suitable 3-D printer, such as an FDM 3-D printer. Thereupon, at 1204, a foam core or honeycomb panel is 3-D printed, and aluminum nodes are also 3-D printed. In one embodiment, of the three structures additively manufactured in collective steps 1202, 1204, two or more of the structures are co-printed. It should be noted that different materials may be used than the materials identified, depending on the embodiment and objectives.

At 1206, the tooling shell is coupled to or adjoined with the foam core. In some embodiments where the two components are additively manufactured as a single unit, this step may be unnecessary. In other embodiments, an appropriate adhesive, screw, clamp, or other connection means may be used.

At 1208, the appropriate material, such as GFRP, is inlaid over the tooling shell and is prepared and cured in a composite fabrication process. In some embodiments, the tooling shell and foam core have an adhesive means to adhere to the composite. In other embodiments, other adherence mechanisms may be used. At 1210, for example, the aluminum nodes printed at 1204 may be used to clamp the composite material to the tooling shell in a manner described above with respect to FIG. 11.

Thereupon, at 1212, the resulting integrated structure may be used as a component in a transport structure. In some embodiments discussed above, the structure may use a lattice or other mechanical arrangement, such as a CFRP layer, to provide additional support depending on the stresses to which the structure may be subject. The tooling shell can be optimized and printed with pockets for placing additional reinforcement where needed. In an embodiment, GFRP is overlaid with the tooling structure, but CFRP is used in pockets on the tooling shell to optimize load path for load transfer. These configurations may also enable the use of unidirectional reinforcement in the pockets/features on the tooling shell as well as woven reinforcement. In an example, unidirectional reinforcement has fibers in one direction while woven reinforcement may have fibers running at 0-degree and 90-degree angles, or other angles between 0-degrees and 90-degrees. In transport structures and other wheeled vehicles, load transfer is the change of load sustained by the different wheels during the processes of longitudinal and lateral acceleration, which includes braking and deceleration. Other types of loads may also be involved in transport structures and mechanized assemblies. A shear load is a force that causes shear stress when applied to a structural element. Reinforcement using composite fiber materials, lattices, and other structures may be necessary in cases where load the transfer mechanics of a part, including the expected shear loads, dictates it.

In other embodiments, multi-material tools may be used. For example, certain sections of the tooling may be printed with a dissolvable material. Once the composite is overlaid and cured, these sections may be dissolved. This technique may be ideal for weight saving mechanisms and in designs where only the composite shell is needed. In the case where only composite skin is needed in a certain section, multi-material tools may be used. In an embodiment, release mechanisms (release agents, tooling surface preparation, etc.) may be used to enable certain sections of the tooling to come out or become available after the composite has cured to achieve sections with just composite skin.

Figure 14A:
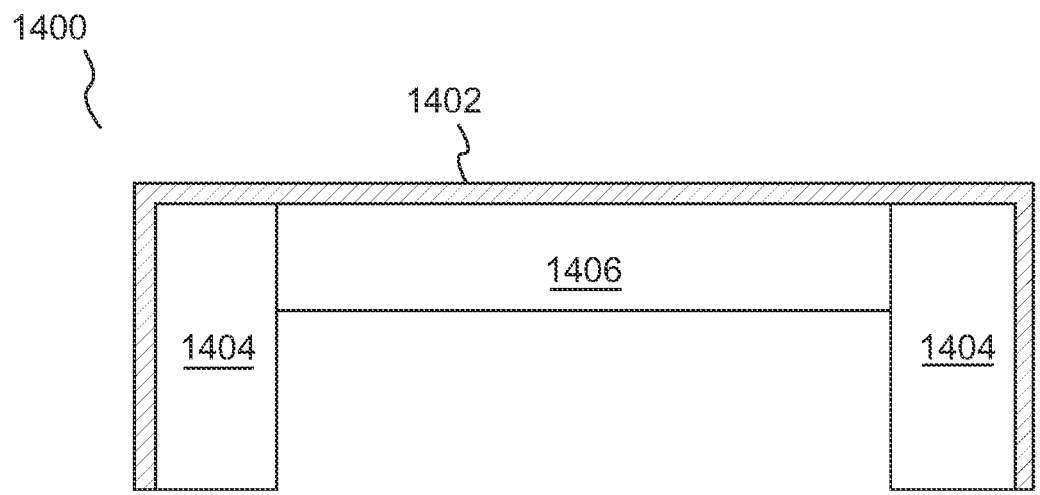
FIGS. 14A-B illustrate examples of an integrated structure using a composite skin and multi-material tools.
Figure 14B:
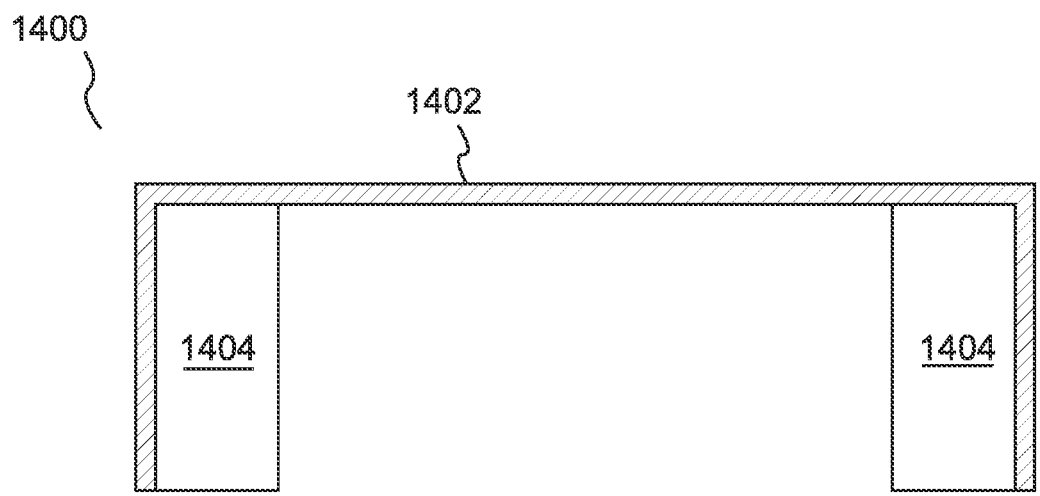

FIGS. 14A-B are examples of an integrated structures 1400 using a composite skin and multi-material tools. Referring to FIG. 14A, a multi-material tooling shell including components 1404 and 1406 may be additively manufactured. Here, unlike component 1404 which may be an ordinary thermoplastic or other suitable material rendered using FDM (or in some cases, it may be a metallic material rendered using some other AM technology), component 1406 may constitute a known dissolvable material. A skin or material 1402 such as GFRP or CFRP is laid up over the tooling shell as discussed above. It is desired that the final integrated structure include components 1404 and 1402. However, component 1406 is used merely for molding purposes to shape and stabilize material 1402 and to allow it to cure. Accordingly, after material 1402 is cured, component 1406 may be dissolved away using techniques conventionally known to produce the final integrated structure 1400 in FIG. 14B. Using these multi-material techniques in conjunction with the methods disclosed herein, an increasingly wide variety of structures may be produced.

Figure 15:
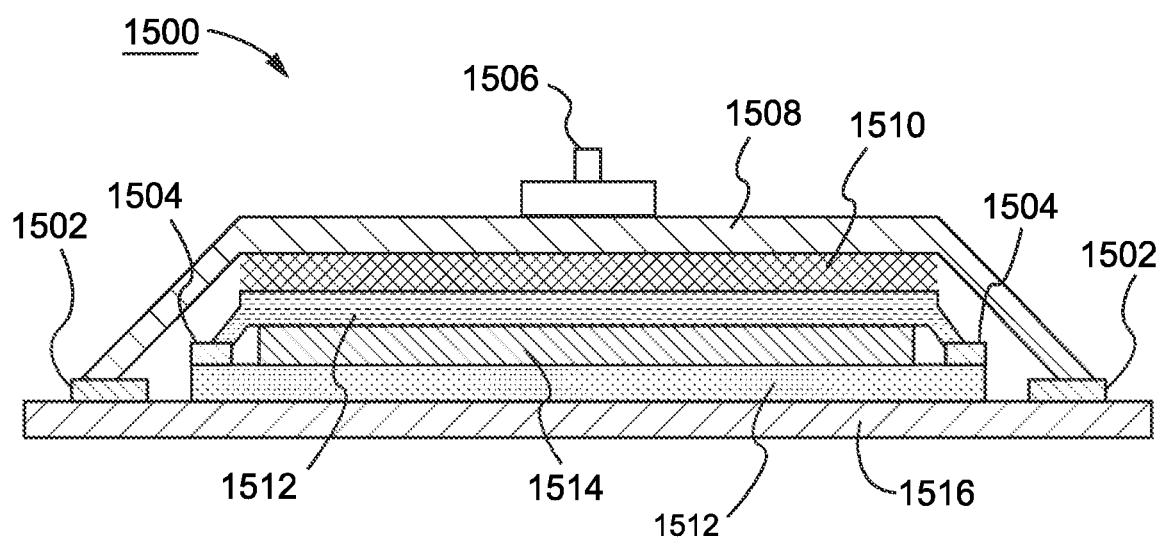
FIG. 15 is an example of an integrated structure using peel plies on the cured composite surface.

FIG. 15 is an example of an integrated structure 1500 including a composite 1514 such as GFRP, CFRP, or the like. As in prior embodiments, an additively manufactured tool 1516 is used to mold the composite 1514 during a layup process as well as to be a part of the structure being built. To improve the bonding between the cured composite 1514 and the 3-D Printed tool 1516, a layer of a material with chemically suitable properties, such as peel ply 1512, can be arranged between the tool 1516 and the composite 1514. To enable an accurate result in some embodiments, another layer of peel ply 1512 may be inserted over the composite 1514. Between the upper peel ply layer 1512 and a bagging film 1508 is breather 1510. Bagging film 1508 may include thru-bag vacuum connector for creating negative pressure. Sealant 1502 may be used to seal the bagging film 1508, and a flash tape 1504 may be used to secure the peel ply 1512 to the composite 1514.

On completion of the cure, the nature of the peel ply 1512 enables the cured composite 1514 to be removed from the tool 1516. The peel ply 1512 may leave a certain texture on the surface of the cured composite 1514 that is conducive to adhesive bonding. After discarding the peel ply 1512, adhesive can be applied between the tool-composite interface to form a strong bond between the tool 1516 and composite 1514.

Figure 16:
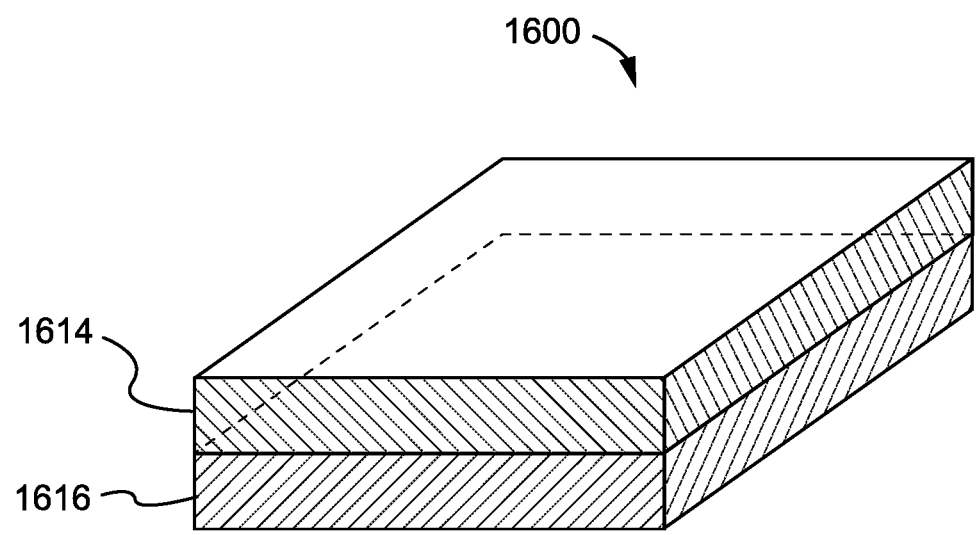
FIG. 16 is an illustration of an AM hybrid composite structure.

FIG. 16 is an illustration of an AM hybrid composite structure 1600. The AM hybrid composite structure 1600 includes a first portion 1614, and a second portion 1616. The first portion 1614 includes a first material. For example, the first portion 1614 may include a composite layup. For example, the first material may be a composite including carbon fiber and resin. The second portion 1616 includes a second material. For example, the second portion 1616 may include an AM tool. The AM tool may include a tooling shell (e.g., an AM tooling shell) and an AM internal core. The second portion 1616 is configured to integrate with the first portion 1614. The second portion 161 further comprising one or more AM elements (not shown) configured to enable integration of the second portion 1616 with the first portion 1614 to form an integrated component, which is the AM hybrid composite structure 1600, including both the second portion and the first portion. For example, the integrated component may be further configured for assembly into a transport structure.

During the layup process, the one or more AM elements are configured to facilitate the integration of the first portion 1614, and the second portion 1616 of the AM hybrid composite structure 1600. Advantageously, the AM tool 1616 enables the tooling function to be facilitated by the one or more AM elements, which are co-printed with the AM tool. For example, the one or more AM elements may be co-printed the AM tooling shell. For another example, the one or more AM elements may be co-printed the AM internal core. The one or more AM elements are further configured to eliminate the need for an external tool, which is a dedicated tool required in traditional manufacturing process. In this way, the manufacturing cost and time can be significantly reduced.

Figure 17:
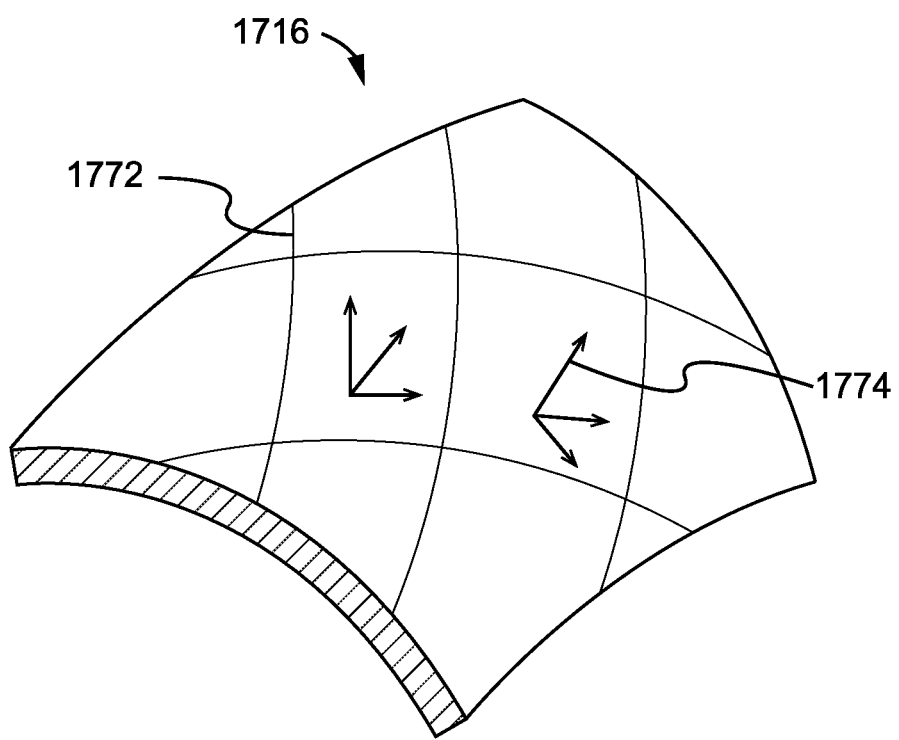
FIG. 17 illustrate an AM hybrid composite structure with one or more guidelines.

FIG. 17 illustrates an AM tool 1716 with one or more guidelines 1772, 1774. Traditional ply placement and orientation are achieved by using external tools. For example, ply books are used traditionally to guide ply placement and orientation. Ply books are 2D drawings that document the layup process typically on a ply-by-ply basis. For another example, a laser projection system may be used as a tool to guide the process of ply placement and orientation. However, a laser projection system can be very expensive, and ply books can be very time-consuming. The AM tool 1716 with the one or more guidelines 1772, 1774 can guide ply placement and orientation and eliminate the need for external tools such as the laser projection system or the ply books. As shown in FIG. 17, one or more guidelines 1772, 1774 to assist in ply placement may be 3-D printed into a surface of the AM tool 1716 to serve as guidance during the composite lamination phase of fabrication.

Figure 18A:
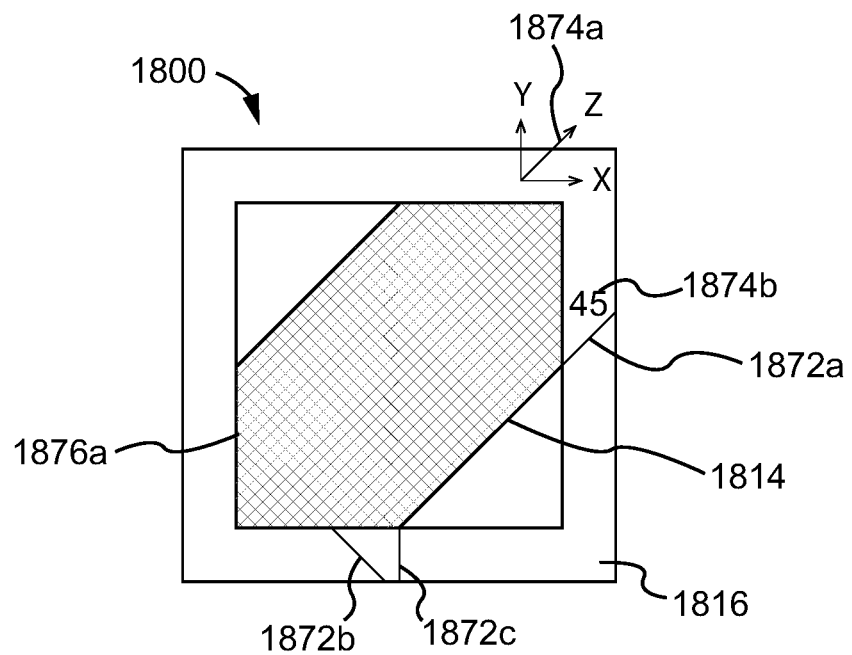
FIG. 18A illustrate a top view of an AM hybrid composite structure with one or more guidelines.
Figure 18B:
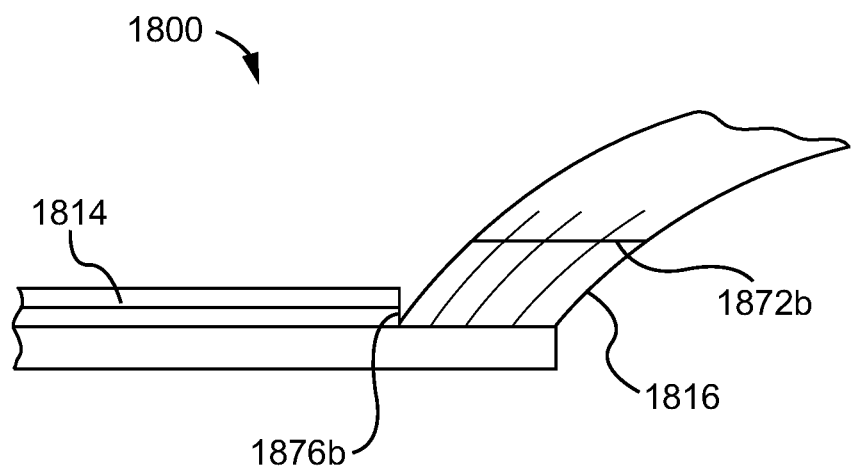
FIG. 18B illustrate a side view of the AM hybrid composite structure with the one or more guidelines in FIG. 18A.

FIG. 18A illustrates a top view of an AM hybrid composite structure 1800 with one or more guidelines (e.g., 1872*a-d*, 1874*a-b*, 1876*a-b*). FIG. 18B illustrates a side view of the AM hybrid composite structure 1800 with the one or more guidelines (e.g., 1872*a-d*, 1874*a-b*, 1876*a-b*). Referring to FIGS. 18A-B, the AM hybrid composite structure 1800 may include a first portion 1814 and a second portion 1816. For example, the first portion 1814 may include a composite layup, which may include one or more composite plies. For example, the second portion 1816 may include an AM tool 1816. The AM tool 1816 may include one or more AM elements, which may include the one or more guidelines 1872a-d, 1874, 1876a-b, as shown in FIGS. 18A-B. For example, the one or more guidelines (e.g., 1872a-d, 1874a-b, 1876a-b) may be co-printed with the AM tool 1816. The one or more guidelines (e.g., 1872a-d, 1874a-b, 1876a-b) can enable accurate placement of the first portion 1814 (e.g., a carbon fiber composite) over the second portion 1816 (e.g., the AM tool). With the one or more guideline (e.g., 1872a-d, 1874a-b, 1876a-b) co-printed with the AM tool 1816, there is no need for a dedicated external tool such as a laser projection system or a ply book. The AM tool 1816 is further configured to be a placement tool. The one or more guideline (e.g., 1872a-d, 1874a-b, 1876a-b) are configured to be a part of the placement tool, thus eliminating an external placement tool. The one or more guideline (e.g., 1872a-d, 1874a-b, 1876a-b) may be placed on a surface that is viewable by a technician/robot placing the one or more composite plies 1814.

As shown in FIG. 18A, the one or more guideline (e.g., 1872a-d, 1874a-b, 1876a-b) are configured to assist placement of the one or more composite plies. For example, the one or more composite plies of the first portion 1814 may be pre-stacked. For example, the one or more guidelines (e.g., 1872a-d, 1874a-b, 1876a-b) may include one or more sets of guidelines configured to provide instructions and boundaries for trimming operation of the one or more composite plies. Each layer of the one or more composite plies may get guidelines from a peripheral of the layer, such as position, orientation, edge marking, etc. For example, the guidelines 1872a, 1872b, 1872c, and 1872d may provide orientation and placement of the one or more composite plies. For another example, the one or more guidelines may include one or more text or numerical instructions 1874a, 1874b. For example, the guideline 1874a can provide a coordinate system to guide the movement of the one or more composite plies. For example, the one or more guidelines may include one or more edge markings 1876a, 1876b. In some embodiments, the composite layup 1814 may only cover a portion of a cross section of the AM tool 1816. The guidelines (e.g., 1872a-c, 1874a-b, 1876a) may help to place and orientate the composite layup 1814. In some embodiments, the composite layup 1814 may only cover an entire cross section of the AM tool, and the guidelines may help to place and orientate the composite layup.

As shown in FIG. 18B, the one or more guidelines (e.g., 1872d, 1876b) may provide information for stack-up of the one or more composite plies. Since the one or more guidelines (e.g., 1872d, 1876b) are external to the composite layup 1814, they may have information about the orientation of the one or more composite plies, fabric/weave, material, edge markings, and other numerical and text information pertinent to each ply of the composite layup 1814.

Figure 19A:
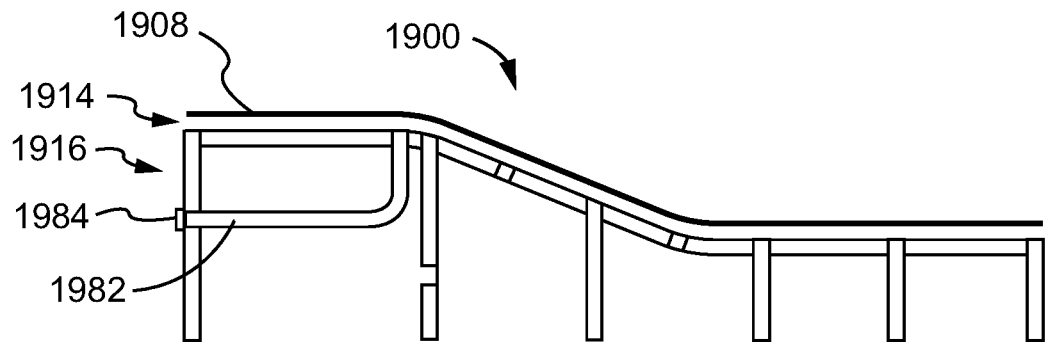
FIGS. 19A-B illustrate an AM hybrid composite structure with one or more vacuum channels.
Figure 19B:
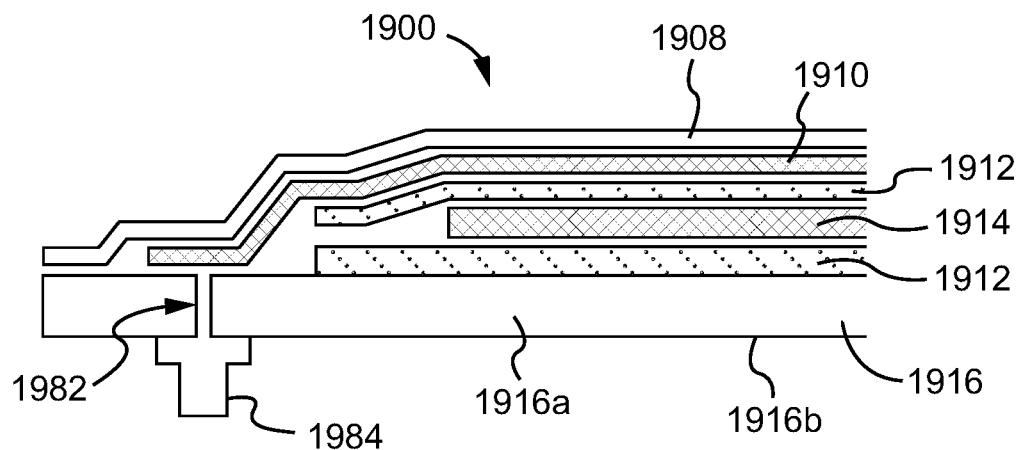

FIGS. 19A-B illustrate an AM hybrid composite structure 1900 with one or more vacuum channels 1982. In some aspects, the AM hybrid composite structure 1900 may include a first portion 1914 and a second portion 1916. For example, the first portion 1914 may include a composite layup, which may include one or more composite plies. For example, the second portion 1916 may include an AM tool. For example, the AM tool 1916 may include a tooling shell 1916a and an internal core 1916b. The AM tool 1916 may include one or more AM elements, which may include the one or more vacuum channels 1982 and vacuum ports 1984, as shown in FIGS. 19A-B. For example, the one or more vacuum channels 1982 and vacuum ports 1984 may be co-printed with the AM tool 1916.

As shown in FIG. 19A, vacuum channels 1982 may be incorporated into the integral composite structure 1900 such that no external vacuum devices to the vacuum bag 1908 are needed. In composite structure fabrication, the application of vacuum bagging over the laminate is usually used to consolidate the composite material and remove trapped gas. Traditional methods require external vacuum generation devices to be attached to the external side of the vacuum bag. However, the attachment of the external vacuum generation devices to the external side of the vacuum bag may increase the cost of the manufacturing process. Extra time may be needed to attach the external vacuum device to the vacuum bag. In addition, there may be leakage at the attachment point of the external vacuum generation devices and the external side of the vacuum bag. The one or more vacuum channels 1982 may be a part of a vacuum tool and eliminate an external vacuum device attached to the vacuum bag 1908. It is advantageous to co-print the one or more vacuum channels 1982 with the AM tool 1916 to eliminate the external vacuum generation devices, thereby reducing the cost and time of the manufacturing process.

FIG. 19B is an example of the AM hybrid composite structure 1900 including the composite layup 1914. For example, the composite layup 1914 may include GFRP, CFRP, or the like. The additively manufactured tool 1916 may be is used to mold the composite 1914 during a layup process as well as to be a part of the integral hybrid composite structure 1900 being built. To improve the bonding between the cured composite 1914 and the 3-D Printed tool 1916, a layer of a material with chemically suitable properties, such as peel ply 1912, can be arranged between the AM tool 1916 and the composite 1914. To enable an accurate result in some embodiments, another layer of peel ply 1912 may be inserted over the composite 1914. Between the upper peel ply layer 1912 and the vacuum bag 1908 may be a breather 1910. In an aspect, a sealant may be used to seal the vacuum bag 1908, and a flash tape may be used to secure the peel ply 1912 to the bottom peel ply layer 1912 or the tool 1916. Comparing FIG. 19B to FIG. 15, importantly, the vacuum bag 1908 does not include a thru-bag vacuum connector. Advantageously, the co-printed one or more vacuum channels 1982 eliminate the external vacuum generation devices being attached to the external side of the vacuum bag 1908.

The one or more vacuum channels 1982 may be a part of the internal core 1916b and extend out of the tooling shell 1916a. The one or more ports 1984 may be disposed on an exterior surface of the AM tool 1916. For example, the one or more ports 1984 may be disposed on an exterior surface of the tooling shell 1916b. For example, the one or more vacuum channels 1982 may extend inward from a respective one or more ports 1984 on the exterior surface of the AM tool 1916. For example, the one or more ports 1984 may be configured to enable a negative pressure to be applied via an associated one or more vacuum channels 1982 to the first portion 1914.

Figure 20A:
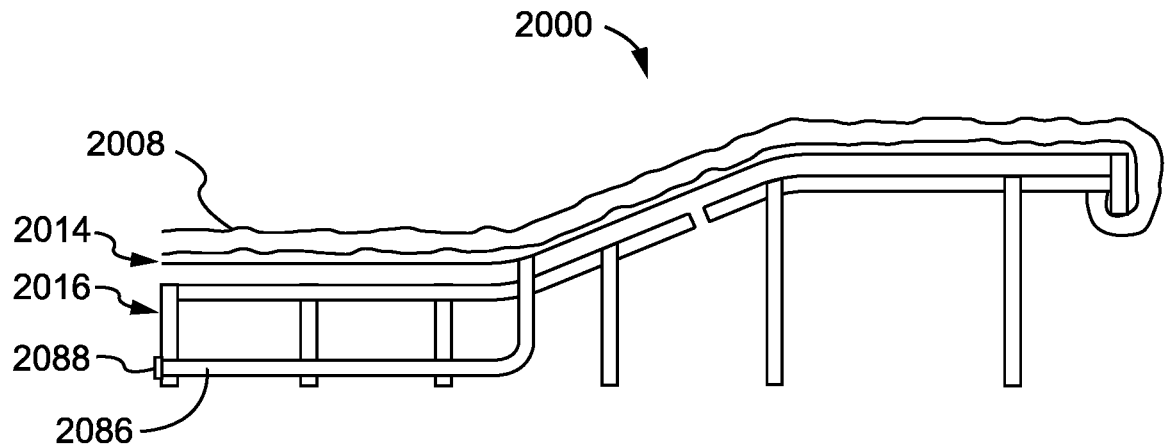
FIGS. 20A-B illustrate an AM hybrid composite structure with one or more resin channels.
Figure 20B:
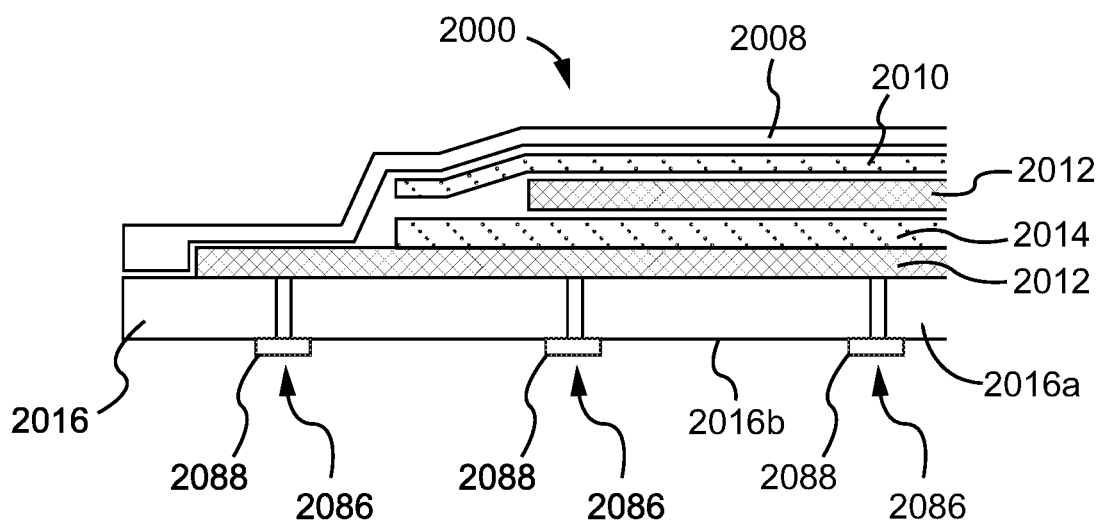

FIGS. 20A-B illustrate an AM hybrid composite structure 2000 with one or more resin channels 2086 and one or more resin ports 2088. In some aspects, the AM hybrid composite structure 2000 may include a first portion 2014 and a second portion 2016. For example, the first portion 2014 may include a composite layup, which may include one or more composite plies. For example, the second portion 2016 may include an AM tool. For example, the AM tool 2016 may include a tooling shell 2016a and an internal core 2016b.

The AM tool 2016 may include one or more AM elements, which may include the one or more resin channels 2086 and resin ports 2088, as shown in FIGS. 20A-B. For example, the one or more resin channels 2086 and resin ports 2088 may be co-printed with the AM tool 2016.

As shown in FIG. 20A, resin channels 2086 may be incorporated into the integral composite structure 2000 such that no external resin devices to the vacuum bag 2008 are needed. One method for manufacturing composite structures is to infuse resin into the composite layup, such as dry fiber. In traditional methods, resin in infused into the fiber using external resin feed lines that also feed into the vacuum bag. Using 3-D printed internal structures for composite structures, resin infusion channels can be incorporated into the 3-D printed core structures such that hardware external to the vacuum bag surface is not necessary. As discussed above, the attachment of the external hardware to the external side of the vacuum bag may increase the cost and time of the manufacturing process. In addition, there may be leakage at the attachment point of the external hardware and the external side of the vacuum bag. The one or more resin channels 2086 may be a part of a resin tool and eliminate external hardware attached to the vacuum bag 2008. It is advantageous to co-print the one or more resin channels 2086 with the AM tool 2016 to eliminate the external hardware, thereby reducing the cost and time of the manufacturing process.

FIG. 20B is an example of the AM hybrid composite structure 2000 including the composite layup 2014. To improve the bonding between the cured composite 2014 and the 3-D Printed tool 2016, a layer of a material with chemically suitable properties, such as peel ply 2012, can be arranged between the AM tool 2016 and the composite 2014. To enable an accurate result in some embodiments, another layer of peel ply 2012 may be inserted over the composite 2014. Between the upper peel ply layer 2012 and the vacuum bag 2008 may be a breather 2010. Advantageously, the co-printed one or more resin channels 2086 eliminate the external hardware being attached to the external side of the vacuum bag 2008.

The one or more resin channels 2086 may be a part of the internal core 2016b and extend out of the tooling shell 2016a. The one or more resin ports 2088 may be disposed on an exterior surface of the AM tool 2016. For example, the one or more resin ports 2088 may be disposed on an exterior surface of the tooling shell 2016a. For example, the one or more resin channels 2086 may extend inward from a respective one or more resin ports 2088 on the exterior surface of the AM tool 2016. For example, the one or more resin channels 2086 may be a part of a resin infusion tool. For example, the one or more resin ports 2088 may be configured to enable resin to be infused via an associated one or more resin channels 2086 to the first portion 2014.

In some aspects, an AM hybrid composite structure may include a first portion and a second portion. For example, the first portion may include a composite layup, which may include one or more composite plies. For example, the second portion may include an AM tool. For example, the AM tool may include a tooling shell and an internal core. The AM tool may include one or more AM elements. The one or more AM elements may include one or more ports and one or more channels. A first set of the one or more ports may be configured to enable a negative pressure to be applied to the first portion via an associated one or more channels. A second set of the one or more ports is configured to enable resin to be infused into the first portion via an associated one or more channels.

Figure 21:
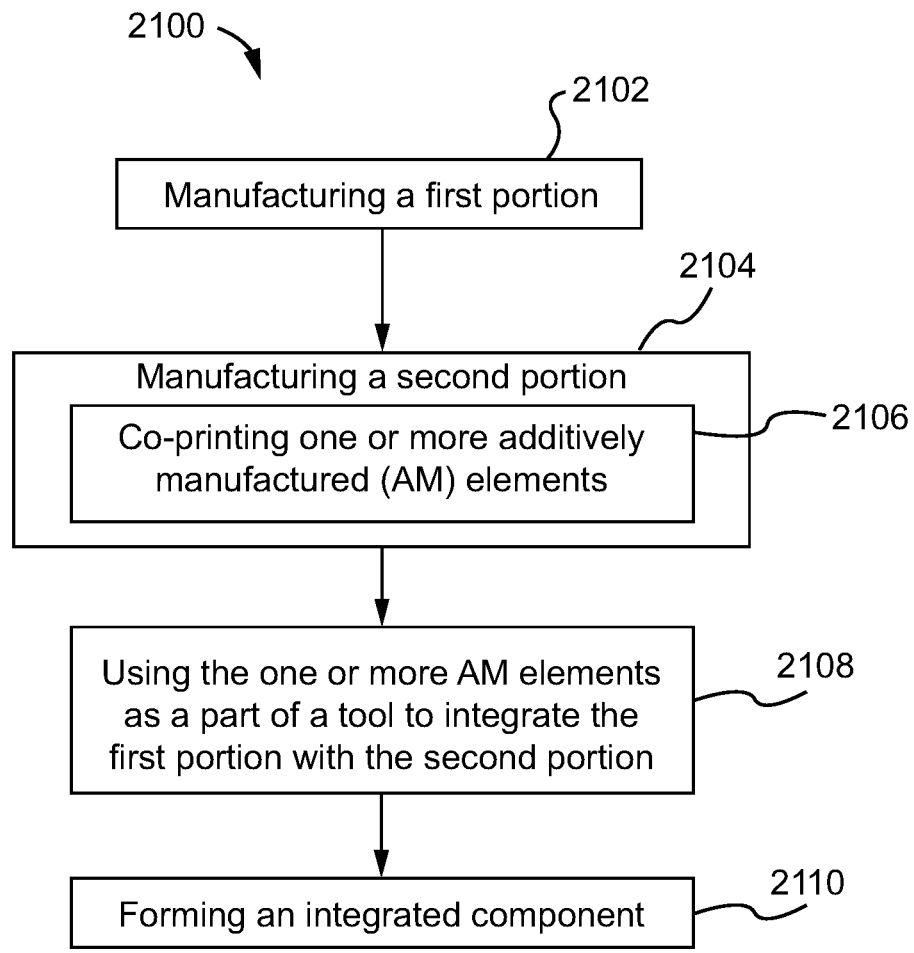
FIG. 21 illustrates a method of manufacturing a hybrid composite structure.

In some aspects, a method of manufacturing a hybrid composite structure 2100 is disclosed, as shown in FIG. 21. The method 2100 includes a step 2102 of manufacturing a first portion. The method 2100 includes a step 2104 of additively manufacturing a second portion. The step 2104 includes co-printing one or more additively manufactured (AM) elements, as illustrated at 2106. The method 2100 includes a step 2108 of using the one or more AM elements as a part of a tool to integrate the first portion with the second portion. The method 2100 further includes a step 2110 of forming an integrated component including both the first portion and the second portion.

For example, the one or more AM elements may comprise one or more guidelines, and wherein the first portion comprises one or more composite plies. For example, using the one or more AM elements as a part of a tool comprises using the one or more guidelines to assist placing the one or more composite plies.

For example, the method 2100 may further include pre-stacking the one or more composite plies. For example, the step 2108 may include using the one or more guidelines to assist orientation of the one or more composite plies.

For example, the one or more AM elements may comprise one or more ports and one or more channels. For example, the step 2108 may comprise using the one or more AM elements to enable negative pressure to be applied to the first portion. For example, the step 2108 may comprise using the one or more AM elements to enable resin to be infused into the first portion.

For example, the second portion comprises a tooling shell and an AM internal core. For example, the step 2106 may comprise co-printing one or more AM ports with the tooling shell. For example, the step 2106 may comprise the second portion comprises a tooling shell and an AM internal core, wherein co-printing one or more AM elements comprises co-printing one or more AM channels with the AM internal core.

For example, the step 2106 may comprise co-printing one or more AM ports, a first portion of the one or more ports being configured to enable a negative pressure to be applied to the first portion, a second portion of the one or more ports being configured to enable resin to be infused into the first portion. For example, the step 2106 may comprise co-printing one or more AM channels, a first set of the one or more channels being configured to enable negative pressure to be applied to the first portion, a second set of the one or more channels being configured to enable resin to be infused into the first portion.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for composite inlay of materials. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An additively manufactured (AM) hybrid composite structure comprising:
a first portion comprising a first material; and
a second portion comprising a second material, the second portion being configured to integrate with the first portion, the second portion further comprising one or more AM elements configured to enable integration of the second portion with the first portion to form an integrated component including both the second portion and the first portion.

2. The AM hybrid composite structure of claim 1, wherein the first portion comprises a composite layup.

3. The AM hybrid composite structure of claim 1, wherein the second portion comprises an additively manufactured (AM) tool.

4. The AM hybrid composite structure of claim 3, wherein the AM tool comprises a tooling shell and an AM internal core.

5. The AM hybrid composite structure of claim 4, wherein the one or more AM elements are co-printed with the AM internal core.

6. The AM hybrid composite structure of claim 1, wherein the integrated component is further configured for assembly into a transport structure.

7. The AM hybrid composite structure of claim 1, wherein the one or more AM elements are further configured to eliminate an external tool to integrate the second portion with the first portion.

8. The AM hybrid composite structure of claim 1, wherein the one or more AM elements comprise one or more guidelines.

9. The AM hybrid composite structure of claim 8, wherein the first portion comprises one or more composite plies.

10. The AM hybrid composite structure of claim 9, wherein the one or more composite plies are pre-stacked.

11. The AM hybrid composite structure of claim 9, wherein the one or more guidelines are configured to assist placement of the one or more composite plies.

12. The AM hybrid composite structure of claim 9, wherein the second portion comprises an additively manufactured (AM) tool, wherein the one or more guidelines are co-printed with the AM tool.

13. The AM hybrid composite structure of claim 9, wherein the one or more guidelines comprises one or more sets of guidelines configured to provide instructions and boundaries for trimming operation of the one or more composite plies.

14. The AM hybrid composite structure of claim 9, wherein the one or more guidelines comprises one or more text or numerical instructions.

15. The AM hybrid composite structure of claim 9, wherein the one or more guidelines comprises one or more edge markings.

16. The AM hybrid composite structure of claim 8, wherein the one or more AM elements are configured to be a part of a placement tool.

17. The AM hybrid composite structure of claim 1, wherein the one or more AM elements comprise one or more ports and one or more channels.

18. The AM hybrid composite structure of claim 17, wherein the one or more AM elements comprise a part of a vacuum tool.

19. The AM hybrid composite structure of claim 17, wherein the one or more AM elements comprise a part of a resin infusion tool.

20. The AM hybrid composite structure of claim 17, wherein the first portion comprises a composite ply, wherein the second portion comprises an AM tool, and wherein the one or more ports are disposed on an exterior surface of the AM tool.

21. The AM hybrid composite structure of claim 20, wherein the one or more channels extend inward from a respective one or more ports on the exterior surface of the AM tool.

22. The AM hybrid composite structure of claim 17, wherein the one or more ports are configured to enable a negative pressure to be applied via an associated one or more channels to the first portion.

23. The AM hybrid composite structure of claim 17, wherein the one or more ports are configured to enable resin to be infused via an associated one or more channels into the first portion.

24. The AM hybrid composite structure of claim 17, wherein a first set of the one or more ports, via an associated one or more channels, is configured to enable a negative pressure to be applied to the first portion, and a second set of the one or more ports, via an associated one or more channels, is configured to enable resin to be infused into the first portion.

25. A method of manufacturing a hybrid composite structure, comprising:
manufacturing a first portion;
additively manufacturing a second portion, comprising co-printing one or more additively manufactured (AM) elements;
using the one or more AM elements as a part of a tool to integrate the first portion with the second portion; and
forming an integrated component including both the first portion and the second portion.

26. The method of claim 25, wherein the one or more AM elements comprise one or more guidelines, and wherein the first portion comprises one or more composite plies.

27. The method of claim 26, wherein using the one or more AM elements as a part of the tool comprises using the one or more guidelines to assist placing the one or more composite plies.

28. The method of claim 26, further comprising pre-stacking the one or more composite plies.

29. The method of claim 26, wherein using the one or more AM elements as a part of the tool comprises using the one or more guidelines to assist orientation of the one or more composite plies.

30. The method of claim 25, wherein the one or more AM elements comprise one or more ports and one or more channels.

31. The method of claim 30, wherein using the one or more AM elements as a part of the tool comprises using the one or more AM elements to enable negative pressure to be applied to the first portion.

32. The method of claim 30, wherein using the one or more AM elements as a part of the tool comprises using the one or more AM elements to enable resin to be infused into the first portion.

33. The method of claim 30, wherein the second portion comprises a tooling shell and an AM internal core, wherein co-printing one or more AM elements comprises co-printing one or more AM ports with the tooling shell.

34. The method of claim 30, wherein the second portion comprises a tooling shell and an AM internal core, wherein co-printing one or more AM elements comprises co-printing one or more AM channels with the AM internal core.

35. The method of claim 30, wherein co-printing one or more AM elements comprises co-printing one or more AM ports, a first portion of the one or more ports being configured to enable a negative pressure to be applied to the first portion, a second portion of the one or more ports being configured to enable resin to be infused into the first portion.

36. The method of claim 30, wherein co-printing one or more AM elements comprises co-printing one or more AM channels, a first set of the one or more channels being configured to enable negative pressure to be applied to the first portion, a second set of the one or more channels being configured to enable resin to be infused into the first portion.

* * * * *